[12] United States Patent
Murray

(10) Patent No.: US 11,442,832 B2
(45) Date of Patent: Sep. 13, 2022

(54) MANAGING SYNCHRONIZED REBOOT OF A SYSTEM

(71) Applicant: Hewlett Packard Enterprise Development LP, Houston, TX (US)

(72) Inventor: Christopher Murray, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 122 days.

(21) Appl. No.: 17/102,501

(22) Filed: Nov. 24, 2020

(65) Prior Publication Data

US 2022/0164271 A1 May 26, 2022

(51) Int. Cl.
*G06F 12/00* (2006.01)
*G06F 11/30* (2006.01)
(Continued)

(52) U.S. Cl.
CPC ........ *G06F 11/3037* (2013.01); *G06F 11/076* (2013.01); *G06F 11/0772* (2013.01); *G06F 11/1441* (2013.01); *G06F 11/3442* (2013.01); *G06F 12/0238* (2013.01); *G06F 12/0871* (2013.01); *G06F 12/0893* (2013.01); *G06F 12/10* (2013.01)

(58) Field of Classification Search
CPC .............. G06F 11/3037; G06F 11/076; G06F 11/0772; G06F 11/1441; G06F 11/3442; G06F 12/0238; G06F 12/0871; G06F 12/0893; G06F 12/10
See application file for complete search history.

(56) References Cited

U.S. PATENT DOCUMENTS 8,886,866 B2 11/2014 Arcese et al.
11,106,442 B1 * 8/2021 Hsiao ........................ G06F 8/61
(Continued)

OTHER PUBLICATIONS

Keep, M.; Preparing for Your First MongoDB Deployment: Capacity Planning and Monitoring, (Web Page), Oct. 8, 2013, 12 Pgs.
(Continued)

*Primary Examiner* — Shawn X Gu
*Assistant Examiner* — Mohammad S Hasan
(74) *Attorney, Agent, or Firm* — Hewlett Packard Enterprise Patent Department

(57) ABSTRACT

Examples described herein relate to a system including a first management system having a primary memory including a free memory, a used memory, and a loosely reserved memory, where the loosely reserved memory comprises cache memory having a reclaimable memory; and a processing resource coupled to the primary memory. The processing resource may monitor an amount of the used memory and an amount of an available memory during runtime of the first management system. Further, the processing resource may enable a synchronized reboot of the first management system if the amount of the used memory is greater than a memory exhaustion first threshold or the amount of the available memory is less than a memory exhaustion second threshold, wherein the memory exhaustion first threshold and the memory exhaustion second threshold are determined based on usage of the reclaimable memory and a number of major page faults.

20 Claims, 10 Drawing Sheets

(51) Int. Cl.
*G06F 11/14* (2006.01)
*G06F 12/0871* (2016.01)
*G06F 11/07* (2006.01)
*G06F 12/02* (2006.01)
*G06F 11/34* (2006.01)
*G06F 12/0893* (2016.01)
*G06F 12/10* (2016.01)

(56) References Cited

U.S. PATENT DOCUMENTS

| | | | |
|---|---|---|---|
| 2010/0077128 | A1 | 3/2010 | Stansell et al. |
| 2012/0079174 | A1* | 3/2012 | Nellans ............... G06F 13/1694 |
| | | | 711/E12.008 |
| 2013/0132699 | A1* | 5/2013 | Vaishampayan ...... G06F 11/076 |
| | | | 711/170 |
| 2017/0228321 | A1* | 8/2017 | Blagodurov ........ G06F 11/3409 |
| 2019/0146699 | A1* | 5/2019 | Apparao ............. G06F 11/3037 |
| | | | 711/171 |
| 2020/0004677 | A1* | 1/2020 | Firoozshahian ...... G06F 3/0608 |
| 2020/0218573 | A1* | 7/2020 | Sun ........................ G06F 9/5016 |
| 2020/0257469 | A1* | 8/2020 | Popli ..................... G06F 11/004 |
| 2021/0019207 | A1* | 1/2021 | Niles ..................... G06F 9/5016 |
| 2021/0117264 | A1* | 4/2021 | Ganti ................... G06F 9/45558 |
| 2021/0248087 | A1* | 8/2021 | Pan .......................... G06F 5/12 |

OTHER PUBLICATIONS

Lee, J.; Introducing Proactive Auto Heal, (Web Page), Aug. 17, 2017, 3 Pgs.

Memory Leak Mitigation and Failure Prevention, (Web Page), Apr. 25, 2019, 5 Pgs.

* cited by examiner

MANAGING SYNCHRONIZED REBOOT OF A SYSTEM

BACKGROUND

Computing systems function using an operating system (OS), such as but not limited to, the Linux OS, the Windows OS, the MAC OS, the android OS and the like. Certain special purpose computing systems may operate using compact, lightweight, and/or embedded OS. These operating systems may include a kernel—a central module of the OS that connects a hardware (e.g., CPU, storage, input-output ports, etc.) of the computing system to an application software (e.g., user-level applications) executing on the OS. During operation of computing system, in certain satiations, excessive memory may be utilized by the application software causing the kernel to release some portion of a memory that is generally being reserved for certain OS level processes. This may cause the computing system to become sluggish and, in extreme situations, may cause the OS to crash abruptly.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

Figure 1:
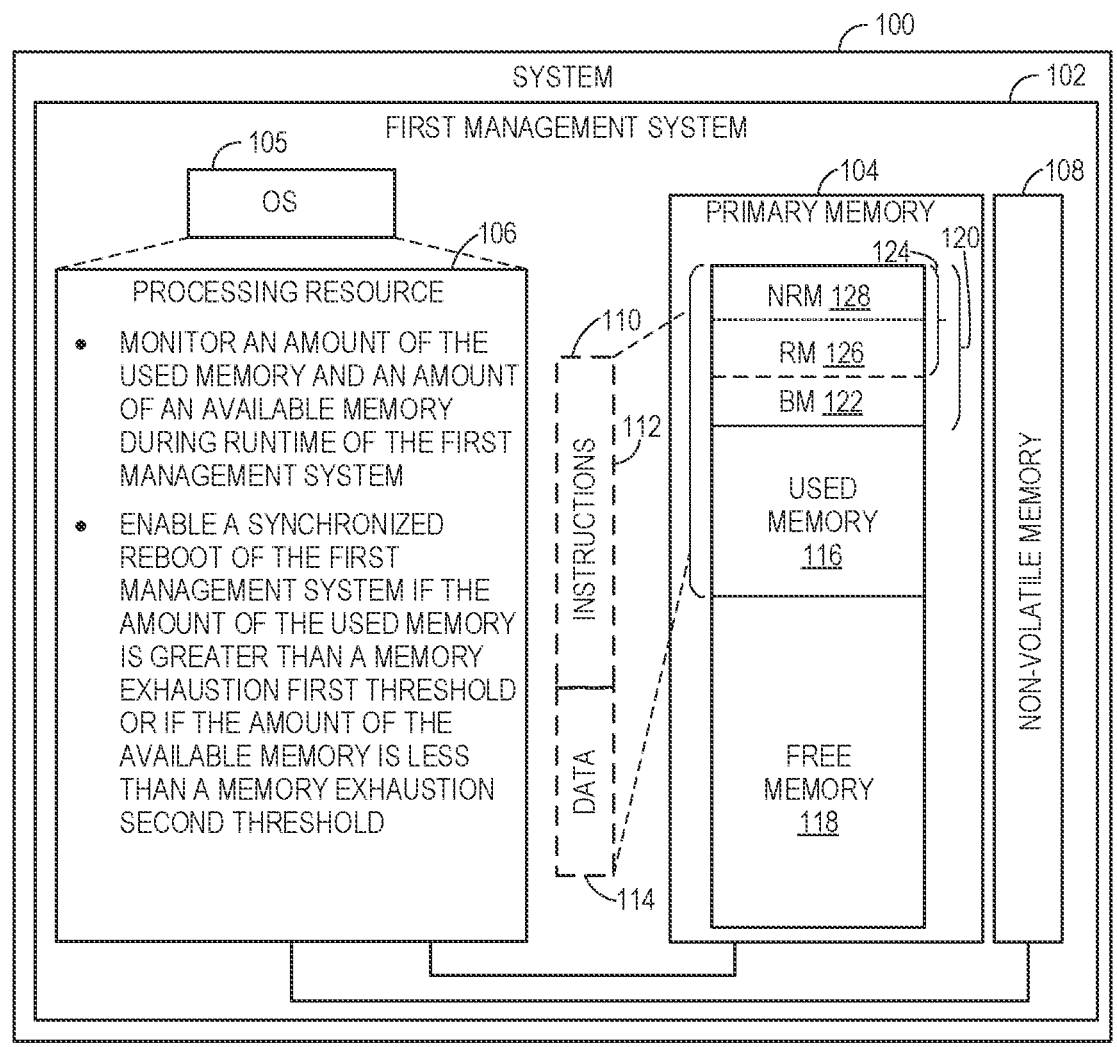
FIG. 1 depicts a system including a first management system, in accordance with an example.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. Further, the term "and/or" as used herein refers to and encompasses any and all possible combinations of the associated listed items. It will also be understood that, although the terms first, second, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Typically, computing systems function using an operating system (OS), such as but not limited to, the Linux OS, the Windows OS, the MAC OS, the android OS and the like. The OS includes a kernel—a central module of the OS that connects a hardware (e.g., CPU, storage, input-output ports, etc.) of the computing system to an application software (e.g., user-level applications) executing on the OS. In particular, the kernel acts as an interface between the application software and the hardware and manages communication between the application software and hardware.

In some applications, a system may include several integral computing systems (e.g., servers implemented as server blades or modules) each running its own OS and storage devices (e.g., storage systems implemented as storage blades or modules). The system may also include one or more management systems that provide management capabilities and certain out-of-band services for the integral computing systems and storage devices of the system. These management systems typically include a volatile memory such as random access memory (RAM) and a non-volatile memory such as non-volatile RAM (NVRAM). In addition, such management systems may operate by executing lightweight or compact OS, for example, embedded Linux (eLinux) and the like. Sometimes, the compact OS may not have capability to access disk memory, as the management system does not require physical storage disk for its operation.

Typically, a kernel of the compact OS executing on a given management system manages the RAM by allocating desired memory to user applications running on the management system. Such user applications that run on the given management system may include applications that manage out-of-band services for the integral computing systems and the storage devices, applications that manage communication between any other standby management systems within the given system, applications that monitor the integral computing systems and the storage devices, applications that manage communications with management systems of other systems connected to the given system.

To aid in the allocation of memory to various user applications running on the given management system, the kernel maintains a mapping of the RAM into a used memory, a free memory, and a loosely reserved memory. The used memory may be defined as a space from the RAM that is already occupied by the user applications running on the management system. The free memory may refer to a space from the RAM that is unoccupied excluding the loosely reserved memory. The loosely reserved memory may include a cache memory and a buffer memory. The buffer memory may include memory that is used by kernel buffers. The kernel stores references to particular modes (e.g., files) that are referenced frequently by the user applications and/or the OS in the cache memory. In some examples, the cache memory may use memory that can be allocated slab wise, wherein a slab may represent a set of one or more contiguous pages of memory. The cache memory may include a reclaimable memory and a non-reclaimable memory. The reclaimable memory may refer to a memory that may be reclaimed for other purposes like user applications when the kernel is running low on the free memory. The non-reclaimable memory may refer to a memory that cannot be allocated to user applications even though the kernel is running low on the free memory. In particular, the non-reclaimable memory is reserved for the kernel.

During operation of the management system, when no sufficient free memory is available to fulfill memory demand to start a new user application or any additional memory demanded by already running user application, the kernel may start releasing the loosely reserved memory to meet the memory demand. In particular, the kernel may first release the buffer memory followed by releasing the reclaimable memory. This indicates that the kernel is releasing its own cache memory to keep the management system running. This may cause the management system to become sluggish. In extreme situations, excessive use of the reclaimable memory may cause the OS running on the management system to crash.

As will be appreciated, in accordance with the aspects of the present disclosure, a system is presented that includes a first management system. In particular, the first management system may obviate the above-mentioned challenges of the traditional systems by continuously monitoring memory usage and comparing the monitored memory usage with respective predetermined thresholds. To achieve these outcomes, the first management system may include a primary memory comprising a free memory, a used memory, and a loosely reserved memory, wherein the loosely reserved memory includes cache memory having a reclaimable memory. Further, the first management system may include a processing resource coupled to the primary memory. The processing resource may monitor an amount of the used memory and an amount of an available memory during runtime of the first management system, wherein the available memory is an estimate of an amount of memory from the primary memory that is available to start an application. Further, the processing resource may enable a synchronized reboot of the first management system if the amount of the used memory is greater than a memory exhaustion first threshold or the amount of the available memory is less than a memory exhaustion second threshold different from the memory exhaustion first threshold. In some examples, the memory exhaustion first threshold and the memory exhaustion second threshold are determined based on usage of the reclaimable memory and a number of major page faults (described later).

In some examples, the synchronized reboot of the first management system may include backing-up data stored in the primary memory, fully or partially, into a non-volatile memory and then rebooting the first management system. In certain examples, in a system having a redundant second management system acting as a standby management system and the first management acting as an active management system, the synchronized reboot of the first management system may include changing a role of the second management system to the active management system and changing the role of the first management system to the standby management system. Further, the synchronized reboot of the first management system may also include rebooting the first management system after the role change of the second management system is completed.

Furthermore, in some examples, the processing resource may also determine whether the amount of the used memory is greater than a used memory decay threshold or the amount of the available memory is less than the available memory decay threshold. The used memory decay threshold and the available memory decay threshold are respectively representative of the amount of the used memory and the amount of the available memory at which the amount of the reclaimable memory begins to decrease below certain threshold amount. Accordingly, by comparing the amount of the used memory with the used memory decay threshold or by comparing the amount of the available memory with the available memory decay threshold, the processing resource may identify that the reclaimable memory has begun decrease. Accordingly, the processing resource may generate some warning, which may be helpful to a user to take any corrective memory management action. In addition, in some examples, the processing resource can back-up the data stored in the primary memory into a non-volatile memory.

The comparison of the amount of the used memory and the amount of the available memory respectively with the memory exhaustion first threshold and the memory exhaustion second threshold may help determine whether there is going to be any drastic increase in the number of major page faults. As soon as the amount of the used memory reaches the memory exhaustion first threshold or the amount of the available memory reaches the memory exhaustion second threshold, the processing resource may initiate the synchronized reboot of the first management system. Consequently, chances of the OS of the first management system crashing abruptly may be minimized.

Referring now to the drawings, in FIG. 1, a system 100 is presented, in accordance with an example. In some examples, the system 100 may be any electronic device capable of storing data, processing data, and/or communicating data with external devices over a network. Examples of the system 100 may include, but are not limited to, a server, a storage device, a network switch, a router, a mobile communication device, a desktop computer, a portable computer, a computing system resource enclosure, and a composable computing system including one or more servers and/or one or more storage devices. The server may be a blade server, for example. The storage device may be a storage blade, for example. Further, in some examples, the computing system enclosure may be a blade enclosure housing one or more blades (e.g., blade servers, storage blades, etc.).

As depicted in FIG. 1, in some examples, the system 100 may include a first management system 102. The first management system 102 may implement various accessibility services for the system 100 and any server and storage blades (not shown) that are installed within the system 100. The first management system 102 may be implemented using a processing resource that is separate from the processing resources of the server blades and the storage blades that are installed within the system 100. In some examples, the first management system 102 may allow a user (such as a system administrator) to perform management operations on the system 100 irrespective of whether the server blades and the storage blades are operational. The first management system 102 may also have management capabilities for sub-systems (e.g., cooling system) of the system 100. Moreover, in certain examples, the first management system 102 may provide so-called "out-of-band" (OOB) services, such as remote console access, remote reboot and power management functionality, monitoring health of the system 100, access to system logs, and the like. The term OOB services as used herein may refer to any service provided by the first management system 102 execution of which does not interfere with instructions or workloads running on the storage blades and/or the server blades installed in the system 100. The first management system 102 may include an interface (also referred to as a management channel) such as a network interface, and/or serial interface to enable communication with the first management system 102.

The first management system 102 may include a primary memory 104, a processing resource 106, and a non-volatile memory 108. The processing resource 106 may be a physical device, for example, one or more central processing unit (CPU), one or more semiconductor-based microprocessors (single core or multicore), application-specific integrated circuit (ASIC), a field programmable gate array (FPGA), other hardware devices capable of retrieving and executing instructions, or combinations thereof. The processing resource 106 may fetch, decode, and execute the instructions to enable a synchronized reboot of the first management system 102 under low-memory situations. As an alternative or in addition to executing the instructions, the processing resource 106 may include at least one integrated circuit (IC), control logic, electronic circuits, or combinations thereof that include a number of electronic components for performing the functionalities intended to be performed by the first management system 102 by executing an operating system (OS) 105.

In some examples, the OS 105 may be compact, lightweight, and/or embedded OS. In some examples, the compact, lightweight, and/or embedded OS may be designed to perform specific set of tasks and need not manage disk storage. One example of the OS 105 may be the embedded Linux OS. The processing resource 106 may run the OS 105 by executing respective instructions stored in the non-volatile memory 108 that are fetched into the primary memory 104. The OS 105 may also include a kernel (not shown). The kernel of the OS 105 connects a hardware (e.g., the processing resource 106, the primary memory 104, the non-volatile memory 108, input-output ports (not shown), etc.) of the first management system 102 to an application software (e.g., user applications) executing on the OS 105. In particular, the kernel of the OS 105 manages communication between the application software and the hardware by acting as an interface between the application software and the hardware. In some examples, the kernel of the OS 105 may occupy certain storage space (e.g., a loosely reserved memory and at least some portion of the used memory, described later) in the primary memory 104. User applications that may be executed on the first management system 102 may include applications that manage out-of-band services for the server blades and/or the storage blades; applications that manage communication between any other standby management systems, if any (not shown in FIG. 1) within the system 100; applications that monitor the server blades and/or the storage blades; and/or applications that manage communications with management systems of other systems (not shown in FIG. 1) connected to the system 100.

Both the primary memory 104 and the non-volatile memory 108 are non-transitory. In some examples, the primary memory 104 may be an electronic memory such as a Random Access Memory (RAM). Further, in some examples, the non-volatile memory 108 may be an electronic memory such as an Electrically. Erasable Programmable Read-Only Memory (EEPROM), a flash memory, or a non-volatile RAM. In some examples, the non-volatile memory 108 may be encoded with executable instructions. These instructions may include instructions that are part of an operating system 105 (described later) and instructions that cause the processing resource 106 to perform one or more methods, for example, methods described in FIGS. 3 and 8-10. During operation of the first management system 102, these instructions are loaded into the primary memory 104 from the non-volatile memory 108 for execution by the processing resource 106. Reference numeral 110 may represent a virtualized memory (hereinafter referred to as a virtual memory 110) formed by the processing resource 106 that may include pointers to instructions 112 and data 114 that are loaded into the primary memory 104 from the non-volatile memory 108.

In some examples, memory space of the primary memory 104 may be categorized into a used memory 116, a free memory 118, and a loosely reserved memory 120. The used memory 116 may be defined as a space from the primary memory 104 that is already occupied by the user applications running on the first management system 102. The free memory 118 may refer to a space from the primary memory 104 that is unoccupied excluding the loosely reserved memory 120. The loosely reserved memory 120 may include a buffer memory (BM) 122 and a cache memory 124. The buffer memory 122 may include memory that is used by kernel buffers. The kernel stores references to particular inodes (e.g., files) that are referenced frequently by the user applications and the OS 105 in the cache memory 124. In some examples, the cache memory 124 may use memory that can be allocated slab wise, wherein a slab may represent a set of one or more contiguous pages of memory.

The cache memory 124 may include a reclaimable memory (RM) 126 and a non-reclaimable memory (NRM) 128. The reclaimable memory 126 may refer to a memory that may be reclaimed for other purposes like user applications when the kernel is running low on the free memory 118. The non-reclaimable memory 128 may refer to a memory that cannot be allocated to user applications even though the kernel is running low on the free memory. In particular, the non-reclaimable memory 128 is reserved for the kernel. In some implementations, the loosely reserved memory 120 may also include certain additional memory regions in addition to the buffer memory 122 and the cache memory 124, without limiting the scope of the present disclosure. Further, in certain implementations, the cache memory 124 may also include certain additional memory regions in addition to the reclaimable memory 126 and the non-reclaimable memory 128, without limiting the scope of the present disclosure.

In addition to above mentioned categorization of the primary memory 104, the kernel of the OS 105 may also keep a track of an available memory within the primary memory 104. The available memory may represent an estimation of an amount of memory that is available for starting a new user application considering a fact that the kernel is capable of releasing a portion of the loosely reserved memory 120 when needed. For example, during an operation of the first management system 102, if the primary memory 104 is running-out of free memory 118, the kernel may release at least a portion of the buffer memory 122 followed by the reclaimable memory 126. Such portion of the loosely reserved memory 120 that is releasable by the kernel is also accounted in the estimation of the available memory. Therefore, at any given time, the amount of the available memory may be higher than the amount of the free memory 118.

As briefly noted hereinabove, during the operation of the first management system 102, as the user applications are executed and/or when the new user application(s) are initiated, more and more amount of the free memory 118 is occupied causing the amount of the used memory 116 to increase. In certain instances, the first management system 102 may experience low-memory situations if amount of the used memory 116 increases beyond certain value. In such low-memory situation, the kernel of the operating system 105 may start releasing its own memory (e.g., the loosely reserved memory 120) to meet the memory demand. In particular, the kernel may first release the buffer memory 122 followed by releasing the reclaimable memory 126.

In a conventional management system, when an amount of used memory increases and no sufficient free memory is available to fulfill memory demanded by a new user application or any additional memory demanded by already running user applications, a kernel may start releasing its own cache memory to keep the conventional management system running. This may cause the conventional management system to become sluggish. In extreme situations, excessive use of the reclaimable memory may cause an OS running on the conventional management system to crash if too much additional memory is demanded by the user applications.

In certain situations, one possible reason for such sluggishness and of crashing of the conventional management system is an exponential increase in a number of major page faults as a result of an increase in the amount of the used memory and/or reduction in the amount of the available memory during operation. Typically, a page fault may refer to an event or an exception raised by the kernel when one or more pages (containing instructions and/or data) that are requested by a user application and/or an operating system are not found in the virtual memory causing the one or more pages to be fetched from the primary memory into the virtual memory. On the other hand, the term major page fault may be defined as an event or an exception raised by the kernel when one or more pages (containing instructions and/or data) that are requested by the user application and/or the operating system are not found in the virtual memory as well as in the primary memory. When such an event occurs, the requested page(s) may need to be retrieved from the non-volatile memory separate from the primary memory.

Moreover, since an embedded OS does not have a swap capability with the storage disks, all the requested pages may need to be copied to the primary memory from the non-volatile memory without removing certain pages pertaining to the user applications from the primary memory. Since the kernel cannot swap out the pages that have been allocated to the user applications, the kernel may end up swapping in and out the code segments that are to be executed. Accordingly, what may happen is the free memory may be depleted, the used memory be full, but the kernel may try to swap in and out code segments (e.g., programming instructions pertaining to the OS 105) from the non-volatile memory that have to be executed. Moreover, such major page fault may cause increased utilization of the primary memory. Accordingly, amount of the available memory may drastically reduce and the amount of the used memory any quickly increase. As the amount of the used memory increases, number of major page faults may also increase exponentially which may in turn slow-down the management system and cause the operation system to crash.

In accordance with aspects of the present disclosure, the processing resource 106 of the first management system 102 may monitor the primary memory 104 during a runtime of the first management system 102 in order to obviate the above-mentioned shortcomings of the conventional systems and to enable a synchronized reboot of the first management system 102. The term runtime may refer to an operation of the first management system 102 when the first management system 102 is functioning in a real-time field application of the system 100. In some examples, during the runtime of the first management system 102, the processing resource 106 may monitor the amount of the used memory 116 and the amount of an available memory. Further, the processing resource 106 may determine whether the amount of the used memory 116 is greater than a memory exhaustion first threshold ($ME_{TH1}$) or the amount of the available memory is less than a memory exhaustion second threshold ($ME_{TH2}$). The memory exhaustion second threshold ($ME_{TH2}$) is different from the memory exhaustion first threshold ($ME_{TH1}$).

In some examples, the memory exhaustion first threshold ($ME_{TH1}$) and the memory exhaustion second threshold ($ME_{TH2}$) are determined by the processing resource 106 during a test phase of the first management system 102 based on usage of the reclaimable memory 126 and a number of major page faults during a test phase of the first management system 102. In certain other examples, the processing resource 106, during the test phase, may also determine additional thresholds such as a used memory decay threshold ($UMD_{TH}$) and an available memory decay threshold ($AMD_{TH}$) that way serve as warning thresholds indicative of a start of depletion of the reclaimable memory 126. The term "test phase" may refer to an operation of the first management system 102 during which the processing resource 106 determines various memory thresholds, such as, the used memory decay threshold ($UMD_{TH}$), the available memory decay threshold ($AMD_{TH}$), the memory exhaustion first threshold ($ME_{TH1}$) and the memory exhaustion second threshold ($ME_{TH2}$). The test phase may include a memory allocation and monitoring phase that is described in greater detail in conjunction with FIGS. 3A and 4-7. Further, the test phase may include a threshold determination phase that is described in greater detail in conjunction with FIGS. 3B and 4-7.

Further, the processing resource 106 may enable a synchronized reboot of the first management system 102 in response to determining that the amount of the used memory is greater than the memory exhaustion first threshold ($ME_{TH1}$) or the amount of the available memory is less than the memory exhaustion second threshold ($ME_{TH2}$). In one example, the synchronized reboot of the first management system 102 may include backing-up data stored in the primary memory 104, fully or partially, into the non-volatile memory 108 and then rebooting the first management system 102. Additional details regarding the synchronized reboot of the first management system 102 is described in conjunction with methods described in FIGS. 8-10.

Figure 2:
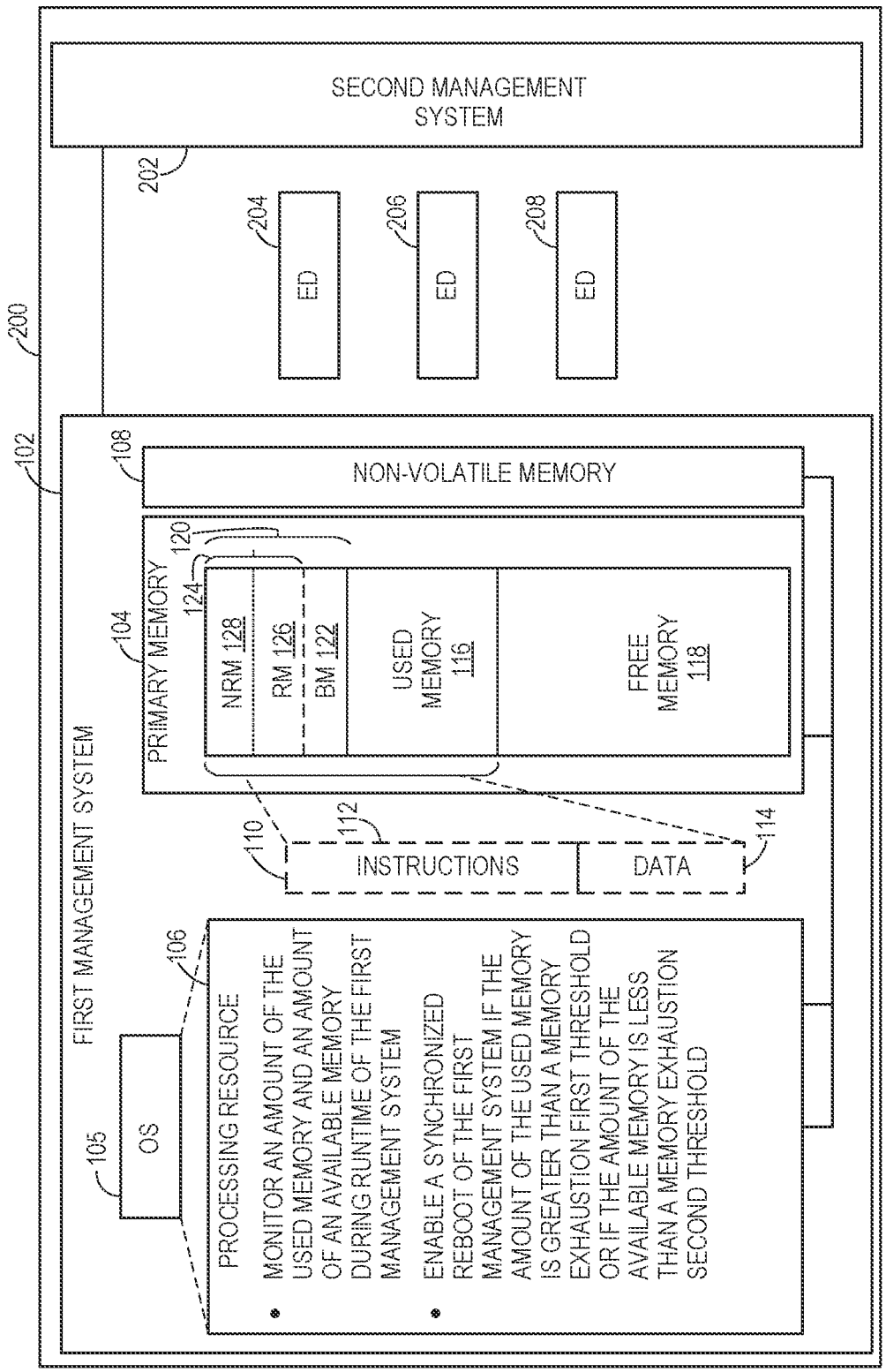
FIG. 2 depicts a system including a first management system and a second management system, in accordance with another example.

FIG. 2 depicts a system 200, in accordance with another example. The system 200 may be representative of one example of the system 100 of FIG. 1. Examples of the system 200 may include, but are not limited to, a server, a storage device, a network switch, a router, a mobile communication device, a desktop computer, a portable computer, a computing system resource enclosure, and a composable computing system including one or more servers and/or one or more storage devices. The server may be a blade server, for example. The storage device may be a storage blade, for example. Further, in some examples, the computing system enclosure may be a blade enclosure housing one or more blades (e.g., blade servers, storage blades, etc.). Further, the system 200 may include certain components that are similar to the ones described in FIG. 1, description of which is not repeated herein. For example, the system 200 includes the first management system 102 that is already described in FIG. 1. In addition, the system 200 may include a second management system 202 and electronic devices 204, 206, and 208 (hereinafter collectively referred to as electronic devices 204-208). The second management system 202 may be representative of one example of the first management system 102 and include similar components as included in the first management system 102. Further, in some examples, the electronic devices 204-208 may include server blades, storage blades, network switches, routers, and the like.

In some examples, in the system 200, at any given time, one of the first management system 102 or the second management system 202 may be operated as an active management system and the other one may be operated as a standby management system. In the description hereinafter, the first management system 102 is illustrated as being the active management system and the second management system 202 is illustrated as being the standby management system. Both the first management system 102 and the second management system 202 are capable of communicating with the electronic devices 204-208 and provide management services for the electronic devices 204-208. However, at any given time, only the active management system may have active communication links with the electronic devices 204-208. Certain details of the first management system that are described in FIG. 1 are not repeated herein.

During the runtime of the first management system 102, the processing resource 106 may monitor the amount of the used memory 116 and the amount of the available memory. Further, the processing resource 106 may determine whether the amount of the used memory 116 is greater than the used memory decay threshold ($UMD_{TH}$) or whether the amount of the available memory is less than the available memory decay threshold ($AMD_{TH}$). If it is determined that the amount of the used memory 116 is greater than the used memory decay threshold ($UMD_{TH}$) or the amount of the available memory is less than the available memory decay threshold ($AMD_{TH}$), the processing resource 106 may synchronize data stored in the primary memory 104 with the non-volatile memory 108. In some examples, such synchronization of the data may include backing-up certain log files or backing-up all the data stored in the primary memory 104 into the non-volatile memory 108. In fact, a situation in which the amount of the used memory 116 is greater than the used memory decay threshold ($UMD_{TH}$) or the amount of the available memory is less than the available memory decay threshold ($AMD_{TH}$) is indicative of the fact that the kernel of the OS 105 has started releasing the reclaimable memory 126 and there are chances that the first management system 102 may reboot if the reclaimable memory 126 is used beyond certain limit. Therefore, detection of such start of the depletion of the reclaimable memory 126 by monitoring the amount of the used memory 116 and the amount of the available memory may aid in proactively securing, fully or partially, the data stored in the primary memory 104 by creating its backup in the non-volatile memory 108.

The processing resource 106 may continue to monitor the amount of the used memory 116 and the amount of the available memory during the runtime. Further, the processing resource 106 may determine whether the amount of the used memory 116 is greater than the memory exhaustion first threshold ($ME_{TH1}$) or whether the amount of the available memory is less than the memory exhaustion second threshold ($ME_{TH2}$). In some examples, the situation of the amount of the used memory 116 being greater than the memory exhaustion first threshold ($ME_{TH1}$) or the amount of the available memory being less than the memory exhaustion second threshold ($ME_{TH2}$) may be indicative of the fact that the reclaimable memory 126 has dropped and any excessive memory allocation from the primary memory 104 may cause the OS 105 to crash.

At any point in time, if the processing resource 106 determines that the amount of the used memory 116 is greater than the memory exhaustion first threshold ($ME_{TH1}$) or the amount of the available memory is less than a memory exhaustion second threshold ($ME_{TH2}$), the processing resource 106 may enable synchronized reboot of the first management system 102. To effect such synchronized reboot of the first management system 102 that is currently operating as the active management system, the processing resource 106 may first initiate a role change of the second management system 202 from the standby management system to the active management system. Once the second management system 202 becomes the active management system, the processing resource 106 may reboot the first management system 102.

However, in some examples, if the first management system 102 is operational as the standby management system and the second management system 202 is operational the active management system and it is determined that the amount of the used memory is greater than the memory exhaustion first threshold ($ME_{TH1}$) or the amount of the available memory is less than a memory exhaustion second threshold ($ME_{TH2}$), the processing resource 106 may notify the second management system 202 that the first management system 102 is going to reboot. After the second management system 202 is notified, the processing resource 106 may reboot the first management system 102. Method of enabling the synchronized reboot is described in conjunction with FIG. 10.

As will be appreciated, the processing resource 106 may enable a synchronized reboot of the first management system 102 in low-memory situations (e.g., when the amount of the used memory 116 is greater than the memory exhaustion first threshold ($ME_{TH1}$), or the amount of the available memory is less than the memory exhaustion second threshold ($ME_{TH2}$)). This is achieved at least in part due to monitoring of the primary memory 104, in particular, monitoring of the used memory 116 and the available memory and comparing the amounts of the used memory 116 and the available memory with the respective thresholds. In particular, comparison of the amount of the used memory 116 and the amount of the available memory respectively with the used memory decay threshold ($UMD_{TH}$) and the available memory decay threshold ($AMD_{TH}$) may help determine start of the depletion of the reclaimable memory 126. Such determination of the start of the depletion of the reclaimable memory 126 may help generate certain warning message so that a user can perform any memory management operation for lowering memory consumption if the user desires to do so. Also, upon determining that the amount of the used memory 116 is greater than the used memory decay threshold ($UMD_{TH}$) or the amount of the available memory is less than the available memory decay threshold ($AMD_{TH}$), the processing resource 106 may proactively start backing-up the data stored in the primary memory 104 into the non-volatile memory 108.

Moreover, the comparison of the amount of the used memory 116 and the amount of the available memory respectively with the memory exhaustion first threshold ($ME_{TH1}$) and the memory exhaustion second threshold ($ME_{TH2}$) may help determine whether there is going to be any drastic increase in the number of major page faults. As soon as the amount of the used memory 116 reaches the memory exhaustion first threshold ($ME_{TH1}$) or the amount of the available memory reaches the memory exhaustion second threshold ($ME_{TH2}$), the processing resource 106 may initiate the synchronized reboot of the first management system 102. Consequently, chances of the OS 105 of the first management system 102 crashing abruptly may be minimized.

Further, the synchronized reboot of the first management system 102 may aid in switching the role of the second management system 202 of the first management system 102 that is operational as the active management system experiences the low-memory situations. In such situation, the role of the second management system 202 may be changed to an active management system. Advantageously, while the first management system 102 undergoes the reboot, the second management system 202 starts to perform operations that the first management system 102 used to perform. Accordingly, performance of the system 200 may not be impacted due the low-memory situations encountered by the first management system 102.

Figure 3A:
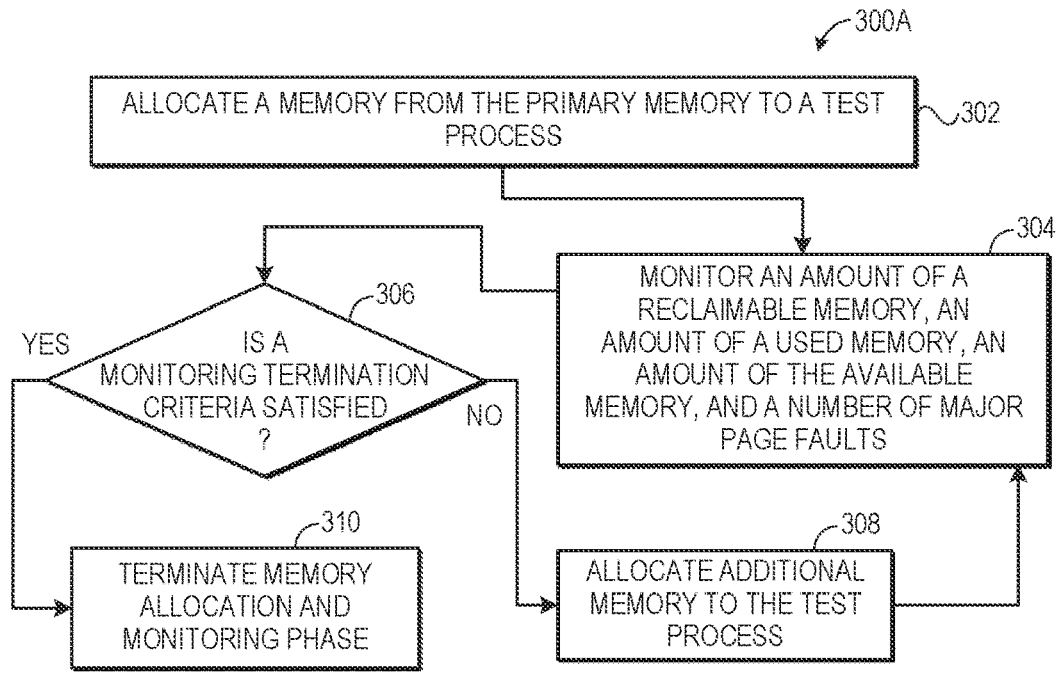
FIG. 3A is a flow diagram depicting a memory allocation and monitoring phase of a test phase corresponding to a first management system, in accordance with an example.
Figure 3B:
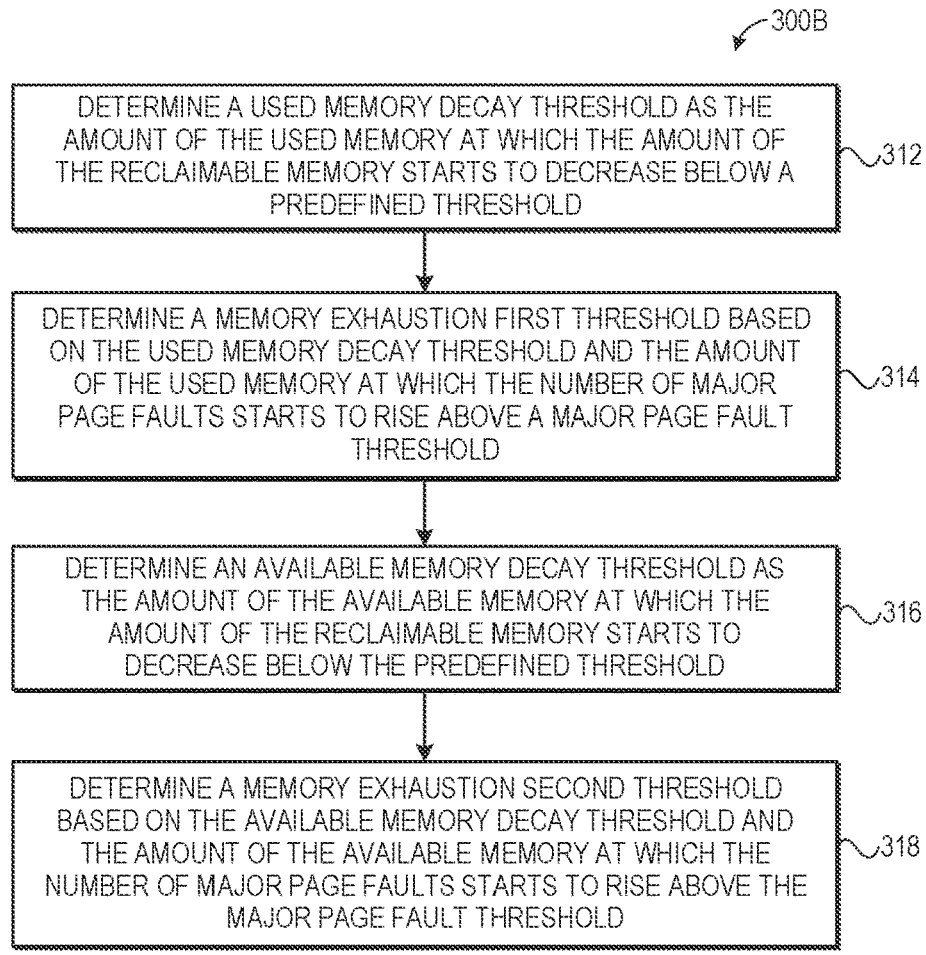
FIG. 3B is a flow diagram depicting a threshold determination phase of a test phase corresponding to a first management system, in accordance with an example.

FIGS. 3A and 3B respectively depict flow diagrams of methods 300A and 300B that collectively define a test phase of the first management system 102, in accordance with an example. By way of example, the method 300A illustrates a memory allocation and monitoring phase of the test phase, in accordance with an example. Further, the method 300B illustrates a threshold determination phase of the test phase in which various thresholds for the used memory 116 and an available memory may be determined. In some examples, the method 300B may be performed concurrently with the method 300A. In certain other examples, the method 300B may be performed after the method 300A is executed. For illustration purposes, the methods 300A and 3003 will be described in conjunction FIGS. 1 and 2.

Referring now to FIG. 3A, the method 300A may include method blocks 302, 304, 306, 308, and 310 (hereinafter collectively referred to as blocks 302-310) which may be performed by a processor-based system, for example, the first management system 102. In particular, operations at each of the method blocks 302-310 may be performed by the processing resource 106 of the first management system 102.

At block 302, the processing resource 106 may allocate a memory to a test process from the primary memory 104. For example, the processing resource 106 may allocate a first amount of memory to the test process at block 302. The test process may be a dummy process that may consume an allocated memory from the primary memory 104 by executing dummy instructions. Further, at block 304, the processing resource 106 may monitor and log/record an amount of the reclaimable memory 126, the amount of the used memory 116, the amount of the available memory, and the number of the major page faults as the primary memory 104 is utilized by the test process. In order to effect such monitoring at block 304, the processing resource 106 may execute instructions which when executed cause the processing resource 106 to command the kernel of the OS 105 to provide the amount of the reclaimable memory 126, the amount of the used memory 116, the amount of the available memory, and the number of the major page faults as the primary memory 104 is utilized by the test process. In certain other examples, the processing resource 106 may execute a predefined application programing interfaces (APIs) that can obtain such information from the kernel of the OS 105. The processing resource 106 may store/log the monitored such amounts in the non-volatile memory 108.

Further, in some examples, at block 306, a check may be performed by the processing resource 106 to determine whether a monitoring termination criterion is satisfied. In one example, the monitoring termination criterion may include the amount of the used memory 116 being equal to or greater than a used memory test threshold. The used memory test threshold may be set to a value close to about 90% of the total memory size of the primary memory 104, for example. In another example, the monitoring termination criterion may include the amount of the available memory being equal to or less than an available memory test threshold. The available memory test threshold may be set to a value close to about 10% of the total memory size of the primary memory 104, for example. In yet another example, the monitoring termination criterion may include the number of the major page faults increasing above certain value, for example, a major page fault threshold (described later). Accordingly, at block 306, if the monitoring termination criterion is not satisfied, at block 308, the processing resource 106 may further allocate additional memory to the test process and continue to perform monitoring at block 304. However, at block 306, if the monitoring termination criterion is satisfied, at block 310, the memory allocation and monitoring phase (e.g., the method 300A) may be terminated. In certain situations, the memory allocation and monitoring phase (e.g., the method 300A) may also be terminated if the OS 105 crashes due to low-memory condition and data monitored at block 304 may be saved in the non-volatile memory 108 for later use by the processing resource 106.

Once the method 300A is executed, the data regarding the amount of the reclaimable memory 126, the amount of the used memory 116, the amount of the available memory, and the number of the major page faults is stored in the non-volatile memory 108. Table-1 depicted below represents an example data stored by the processing resource 106 at various time instances as the primary memory 104 is utilized by the test process.

TABLE 1

Example data logged during the memory allocation and monitoring phase

| Used Memory (KiB) | Available Memory (KiB) | Reclaimable Memory (KiB) | Number of Major Page Faults |
|---|---|---|---|
| 413564 | 487360 | 10668 | 579 |
| 507328 | 393464 | 10788 | 579 |
| 609188 | 291316 | 10832 | 696 |
| 709968 | 192188 | 10704 | 714 |
| 811488 | 92296 | 7336 | 771 |
| 835532 | 68300 | 7148 | 834 |
| 861424 | 48768 | 5868 | 963 |
| 887316 | 41464 | 5544 | 2584 |

Figure 4:
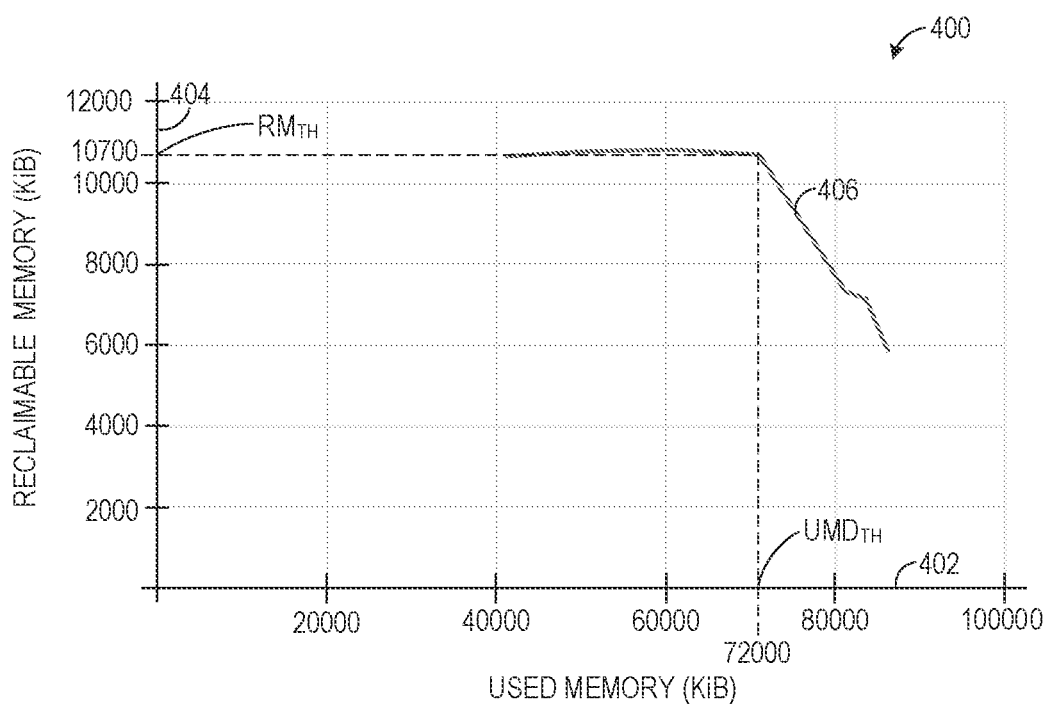
FIG. 4 depicts a graphical representation showing variations in a reclaimable memory with reference to amount of a used memory, in accordance with one example.

For ease of illustration, such data collected during the memory allocation and monitoring phase of the test phase is shown in various graphical representations depicted in FIGS. 4-7. FIGS. 4-7 are briefly described herein prior to moving on the threshold determination phase described in FIG. 3B. Referring now to FIG. 4, a graphical representation 400 showing variations in the amount of the reclaimable memory 126 with reference to the amount of the used memory 116 is depicted, in accordance with one example. In the graphical representation 400, the X-axis 402 represents the amount of the used memory 116 in KiB and the Y-axis 404 represents the amount of the reclaimable memory 126 in KiB. Further, a line 406 represents variations in the amount of the reclaimable memory 126 with reference to the amount of the used memory 116 observed during the memory avocation and monitoring phase. As depicted in the graphical representation 400 of FIG. 4, the amount of reclaimable memory 126 starts to decrease when the amount of the used memory 116 is at about 72000 KiB.

Figure 5:
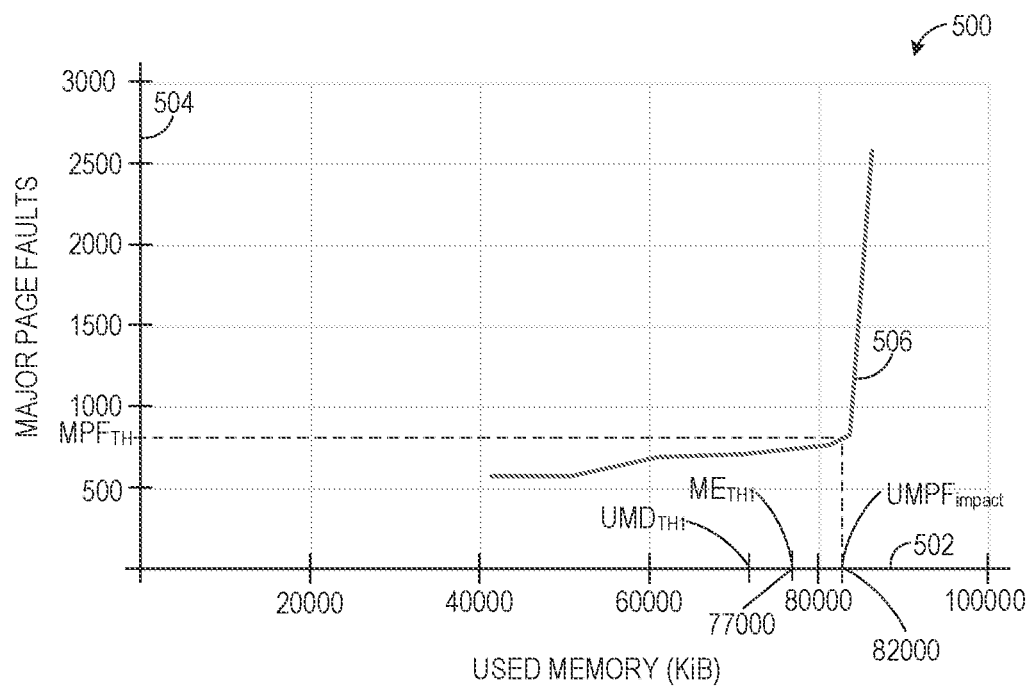
FIG. 5 depicts a graphical representation showing variations in a number of major page faults with reference to amount of a used memory, in accordance with one example.

Further, FIG. 5 depicts a graphical representation 500 showing variations in the major page faults with reference to the amount of the used memory 116, in accordance with one example. In the graphical representation 500, the X-axis 502 represents the amount of the used memory 116 in KiB and the Y-axis 504 represents major page faults. Further, a line 406 represents variations in the number of the major page faults with reference to the amount of the used memory 116 observed during the memory allocation and monitoring phase. As depicted in the graphical representation 500 of FIG. 5, the number of major page faults starts to rise when the amount of the used memory 116 is about 82000 KiB.

Figure 6:
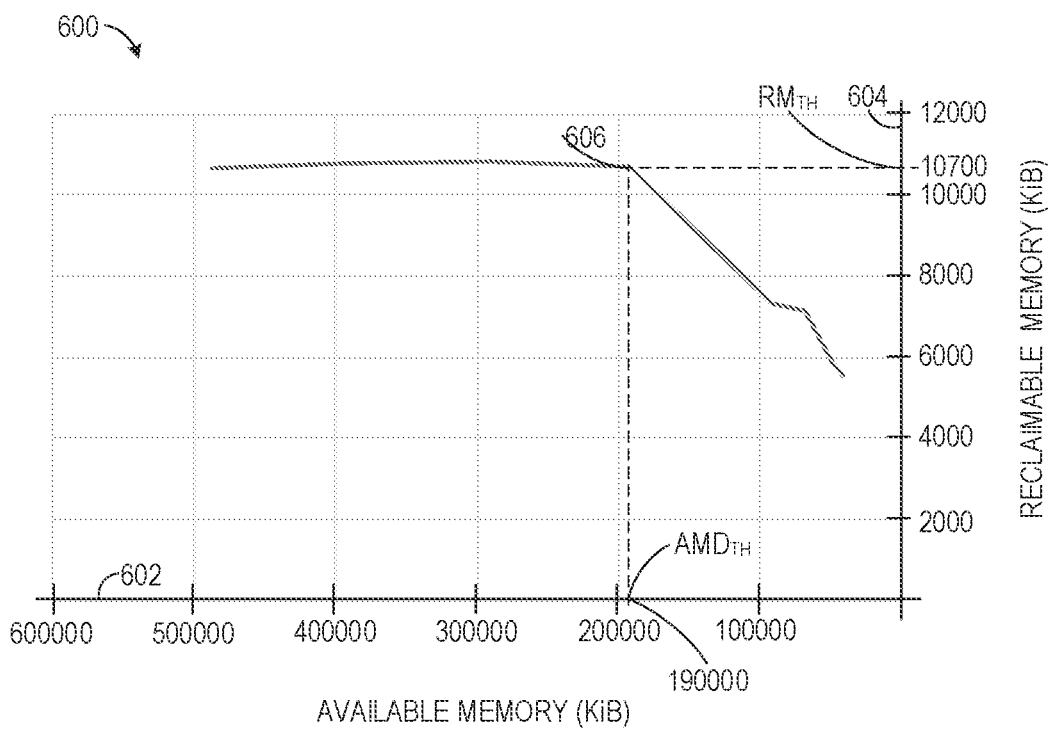
FIG. 6 depicts a graphical representation showing variations in a reclaimable memory with reference to an amount of an available memory, in accordance with one example.

Furthermore, FIG. 6 depicts a graphical representation 600 showing variations in the amount of the reclaimable memory 126 with reference to the amount of the available memory, in accordance with one example. In the graphical representation 600, the X-axis 602 represents the amount of the available memory in KiB and the Y-axis 604 represents the amount of the reclaimable memory 126 in KiB. Further, a line 606 represents variations in the amount of the reclaimable memory 126 with reference to the amount of the available memory observed during the memory allocation and monitoring phase. As depicted in the graphical representation 600 of FIG. 6, the amount of reclaimable memory 126 starts to decrease when the amount of the available memory is reduced to about 190000 KiB.

Figure 7:
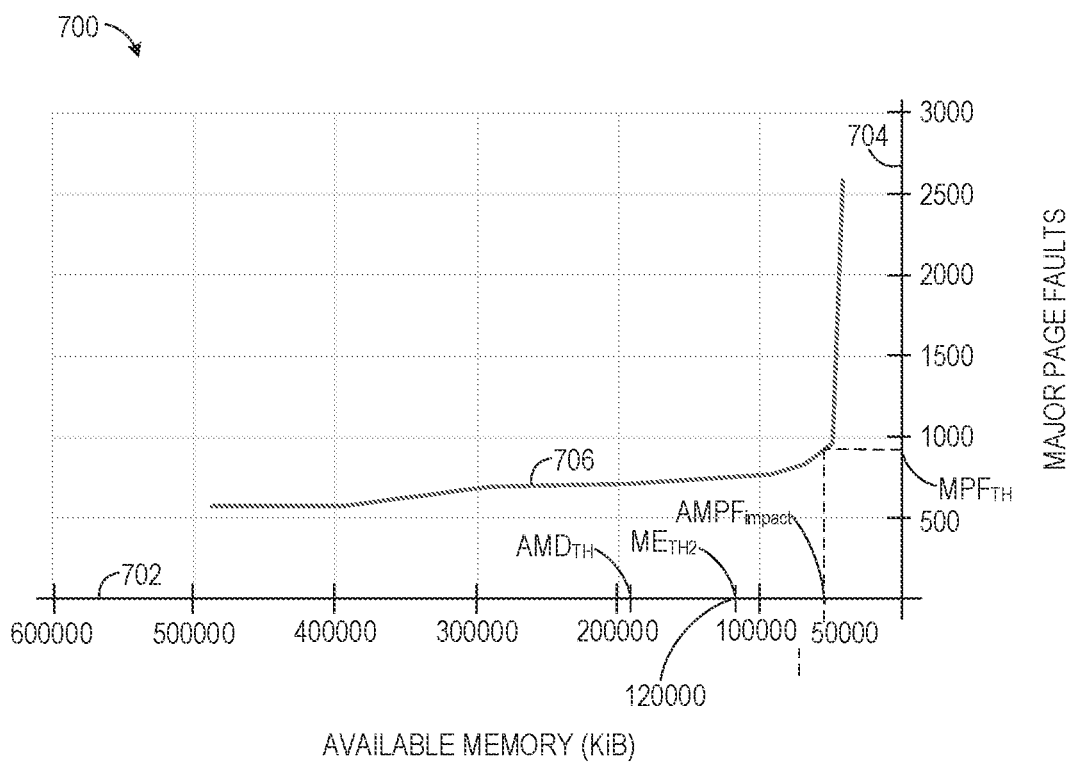
FIG. 7 depicts a graphical representation showing variations in a number of major page faults with reference to amount of an available memory, in accordance with one example.

Moreover, FIG. 7 depicts a graphical representation 700 showing variations in the major page faults with reference to the amount of the available memory, in accordance with one example. In the graphical representation 700, the X-axis 702 represents the amount of the available memory in KiB and the Y-axis 704 represents major page faults. Further, a line 706 represents variations in the number of the major page faults with reference to the amount of the available memory observed during the memory allocation and monitoring phase. As depicted in the graphical representation 700 of FIG. 7, the number of major page faults starts to rise when the amount of the available memory is reduced to about 50000 KiB.

Referring now to FIG. 3B, the threshold determination phase of the test phase, in accordance with one example. The method 300B may include method blocks 312, 314, 316, and 318 (hereinafter collectively referred to as blocks 312-318) which may be performed by a processor-based system, for example, the first management system 102. In particular, operations at each of the method blocks 312-318 may be performed by the processing resource 106 of the first management system 102.

At block 312, the processing resource 106 may determine the used memory decay threshold ($UMD_{TH}$) as the amount of the used memory 116 at which the amount of the reclaimable memory 126 starts to decrease below a predefined threshold ($RM_{TH}$). The predefined threshold ($RM_{TH}$) may define beginning of a decline of the amount of the reclaimable memory 126. Referring again to FIG. 4, the predefined threshold ($RM_{TH}$) may be about 10700 KiB, for example. In the example of FIG. 4, it is observed that the amount of the reclaimable memory 126 starts to decrease below the predefined threshold ($RM_{TH}$) when the amount of the used memory 116 is at about 72000 KiB. Accordingly, in one example, the used memory decay threshold ($UMD_{TH}$) may be set to 72000 KiB.

Turning back to FIG. 3B, at block 314, the processing resource 106 may determine the memory exhaustion first threshold ($ME_{TH1}$) based on the used memory decay threshold ($UMD_{TH}$) and the amount of the used memory 116 at which the number of major page faults starts to rise above a major page fault threshold ($MPF_{TH}$). Referring to the example of FIG. 5, it may be observed that the number of major page faults starts to increase exponentially once the amount of the used memory 116 reaches to a certain value, hereinafter referred to as a used memory page fault impact value ($UMPF_{impact}$). For example, as depicted in FIG. 5, when the amount of the used memory 116 increases beyond about 82000 KiB, the number of major page faults starts to rise exponentially. In some examples, the used memory exhaustion first threshold ($ME_{TH1}$) may be higher than the used memory decay threshold ($UMD_{TH}$) and is determined using following equation (1).

$$ME_{TH1} = UMD_{TH} + \frac{(UMPF_{impact} - UMD_{TH})}{2} \qquad \text{Equation (1)}$$

In one example, considering the available memory page fault impact value ($UMPF_{impact}$) being 82000 KiB, the memory exhaustion first threshold ($ME_{TH1}$) may be determined as being 77000 KiB using equation (1). It may be noted that equation (1) presented hereinabove represents an example calculation for illustration purposes and should not be construed limiting the scope of the present disclosure.

Furthermore, at block 316, the processing resource 106 may determine the available memory decay threshold ($AMD_{TH}$) as the amount of the available memory at which the amount of the reclaimable memory 126 starts to decrease below the predefined threshold (RM$_{TH}$). In the example graphical representation 600 presented in FIG. 6, it is observed that the amount of the reclaimable memory 126 starts to decrease below the predefined threshold (RM$_{TH}$) when the amount of the available memory is at about 190000 KiB. Accordingly, in one example, the available memory decay threshold (AMD$_{TH}$) may be set to 190000 KiB.

Moreover, at block 318, the processing resource 106 may determine the memory exhaustion second threshold (ME$_{TH2}$) based on the available memory decay threshold and the amount of the available memory at which the number of major page faults starts to rise above the major page fault threshold (MPF$_{TH}$). In the example graphical representation 700 presented in FIG. 7, it may be observed that the number of major page faults starts to increase exponentially once the amount of the available memory reaches to a certain value, hereinafter referred to as an available memory page fault impact value (AMPF$_{impact}$). For example, as depicted in FIG. 7, when the amount of the available memory decrease below about 50000 KiB, the number of major page faults starts to rise exponentially. In some examples, the memory exhaustion second threshold (ME$_{TH2}$) may be higher than the available memory decay threshold (AMD$_{TH}$) and is determined using following equation (2).

$$ME_{TH2} = AMD_{TH} - \frac{(AMPF_{impact} - AMD_{TH})}{2} \quad \text{Equation (2)}$$

In one example, considering the available memory page fault impact value (AMPF$_{impact}$) being 50000 KiB, the available memory exhaustion first threshold (ME$_{TH1}$) may be determined as 120000 KiB. It may be noted that equation (2) presented hereinabove represents an example calculation for illustration purposes and should not be construed limiting the scope of the present disclosure.

Figure 8:
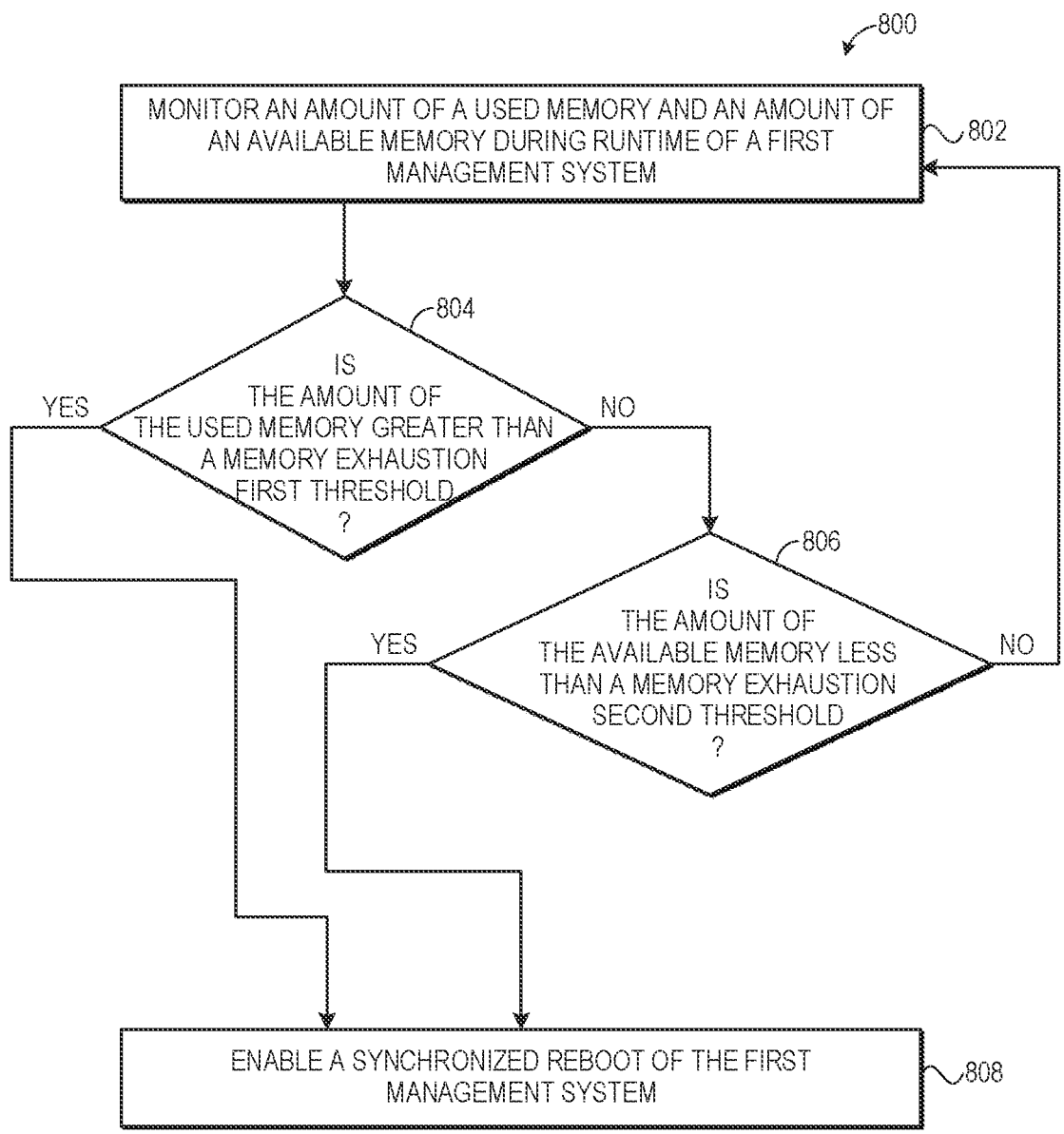
FIG. 8 is a flow diagram depicting a method for operating a first management system, in accordance with one example.

Turning now to FIG. 8, a flow diagram depicting a method 800 for operating a management system such as the first management system 102 is presented, in accordance with one example. For illustration purposes, the method 800 will be described in conjunction with the first management system 102 described in FIGS. 1 and 2. The method 800 may include method blocks 802, 804, 806, and 808 (hereinafter collectively referred to as blocks 802-808) which may be performed by a processor-based system, for example, the first management system 102 during the runtime its runtime. In particular, operations at each of the method blocks 802-808 may be performed by the processing resource 106 of the first management system 102.

At block 802, the processing resource 106 may monitor an amount of the used memory 116 and an amount of an available memory during the runtime of the first management system 102. As previously noted, the available memory is an estimate of an amount of memory from the primary memory 104 that is available to start a new application. In order to effect such monitoring at block 802, the processing resource 106 may execute instructions which when executed command the kernel of the OS 105 to provide the amount of the used memory 116 and the amount of the available memory during the runtime. In certain other examples, the processing resource 106 may execute a predefined application programing interfaces (APIs) that can obtain such information from the kernel of the OS 105.

Further, at block 804, the processing resource 106 may perform a check to determine whether the amount of the used memory 116 is greater than the memory exhaustion first threshold (ME$_{TH1}$). In particular, at block 804, the processing resource 106 may compare the amount of the used memory 116 monitored at block 802 with the memory exhaustion first threshold (ME$_{TH1}$) to determine whether the amount of the used memory 116 is greater than the memory exhaustion first threshold (ME$_{TH1}$). At block 804, if it is determined that the amount of the used memory 116 is greater than the memory exhaustion first threshold (ME$_{TH1}$), the processing resource 106 may execute an operation at block 808 (described later). However, at block 804, if it is determined that the amount of the used memory 116 is not greater than the memory exhaustion first threshold (ME$_{TH1}$), the processing resource 106 may perform another check at block 806.

At block 806, the processing resource 106 may perform a check to determine whether the amount of the available memory is less than the memory exhaustion second threshold (ME$_{TH2}$). In particular, at block 806, the processing resource 106 may compare the amount of the available memory monitored at block 802 with the memory exhaustion second threshold (ME$_{TH2}$) to determine whether the amount of the available memory is less than the memory exhaustion second threshold (ME$_{TH2}$). At block 806, if it is determined that the amount of the available memory is greater than or equal to the memory exhaustion second threshold (ME$_{TH2}$), the processing resource 106 may again continue to monitor the amount of the used memory 116 and the amount of the available memory at block 802.

However, at block 806, if it is determined that the amount of the available memory is less than the memory exhaustion second threshold (ME$_{TH2}$), at block 808, the processing resource 106 may enable a synchronized reboot of the first management system 102. Detailed method steps of the enabling the synchronized reboot of the first management system 102 are described in FIG. 10 (described later). In the method 800, although block 806 is shown as being performed after the execution of the method at block 804 in FIG. 8, in some examples, the methods at blocks 804 and 806 may be performed in parallel. In certain other examples, the order of blocks 804 and 806 may be reversed.

Figure 9:
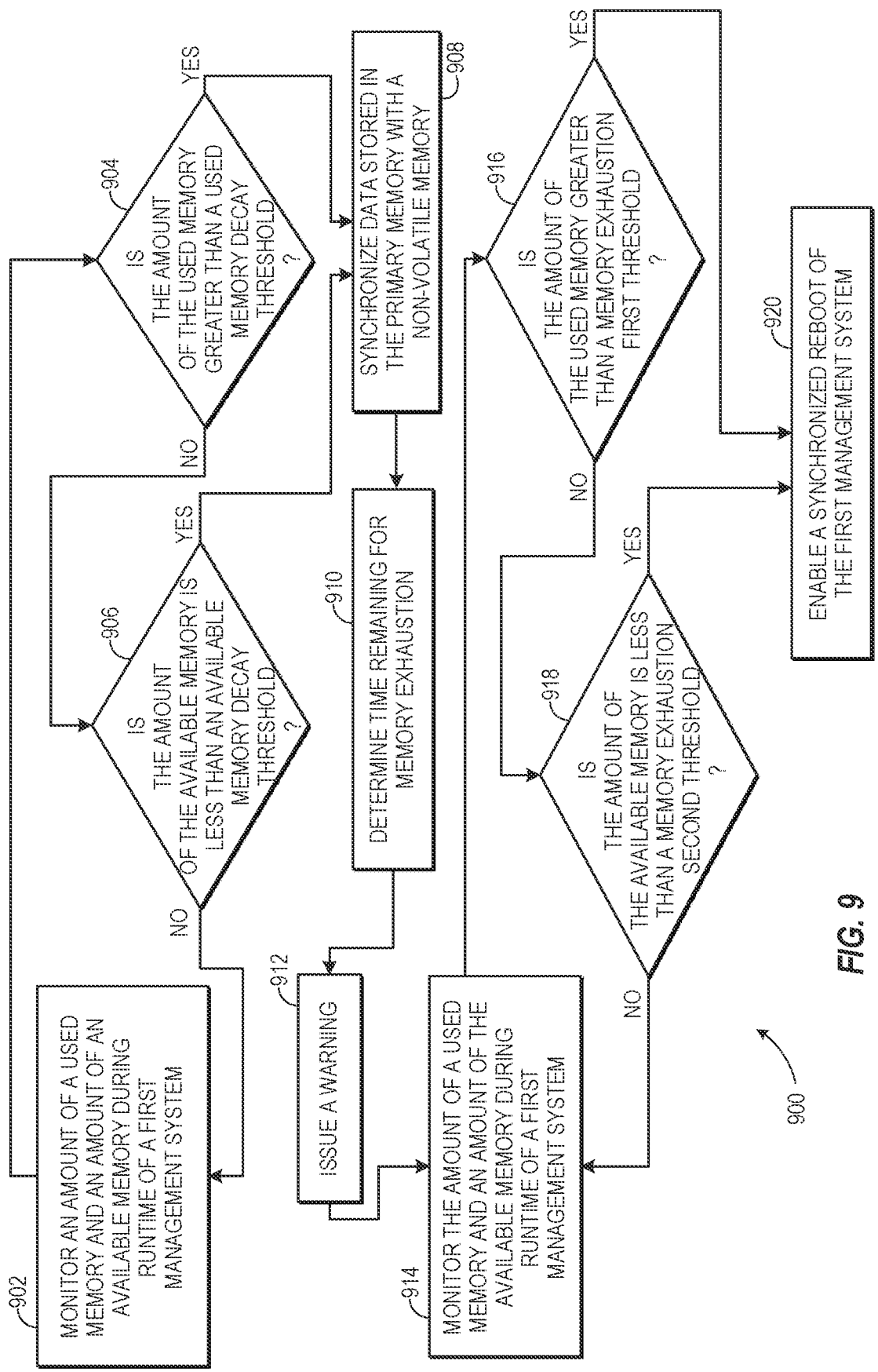
FIG. 9 is a flow diagram depicting a method for operating a first management system, in accordance with another example.

Referring now to FIG. 9, a flow diagram depicting a method 900 for operating the first management system 102 is presented, in accordance with another example. The method 900 may be representative of one example of the method 800 of FIG. 8 and includes certain blocks that are similar to those described in FIG. 8, description of which is not repeated herein. For illustration purposes, the method 900 will be described in conjunction with the first management system 102 described in FIGS. 1 and 2. The method 900 may include method blocks 902, 904, 906, 908, 910, 912, 914, 916, 918, and 920 (hereinafter collectively referred to as blocks 902-920) which may be performed by a processor-based system, for example, the first management system 102. In particular, operations at each of the method blocks 902-920 may be performed by the processing resource 106 of the first management system 102 during its runtime.

At block 902, the processing resource 106 may monitor the amount of the used memory 116 and the amount of an available memory during the runtime of the first management system 102 in a similar fashion as described with reference to the block 802 of FIG. 8. Further, at block 904, the processing resource 106 may perform a check to determine whether the amount of the used memory 116 is greater than the used memory decay threshold ($UMD_{TH}$). In particular, at block 904, the processing resource 106 may compare the amount of the used memory 116 monitored at block 902 with the used memory decay threshold ($UMD_{TH}$) to determine whether the amount of the used memory 116 is greater than the used memory decay threshold ($UMD_{TH}$). At block 904, if it is determined that the amount of the used memory 116 is greater than the used memory decay threshold ($UMD_{TH}$), the processing resource 106 may execute method at block 908 (described later). However, at block 904, if it is determined that the amount of the used memory 116 is not greater than the used memory decay threshold ($UMD_{TH}$), the processing resource 106 may perform another check at block 906.

At block 906, the processing resource 106 may perform a check to determine whether the amount of the available memory is less than the available memory decay threshold ($AMD_{TH}$). In particular, at block 906, the processing resource 106 may compare the amount of the available memory monitored at block 902 with the available memory decay threshold ($AMD_{TH}$) to determine whether the amount of the available memory is less than the available memory decay threshold ($AMD_{TH}$). Although the operation at block 906 is shown as being performed after the operation at block 904 is performed, in some other examples, the operations at blocks 904 and 906 may be performed in parallel. In certain other examples, the order of the execution of blocks 904 and 906 may be reversed.

At block 906, if it is determined that the amount of the available memory is greater than or equal to the available memory decay threshold ($AMD_{TH}$), the processing resource 106 may continue to monitor the amount of the used memory 116 and the amount of the available memory at block 902. However, at block 906, if it is determined that the amount of the available memory is less than the memory exhaustion second threshold ($ME_{TH2}$), at block 908, the processing resource 106 may synchronize data stored in the primary memory 104 with the non-volatile memory 108. In some examples, such synchronization performed by the processing resource 106 may include storing all the content of the primary memory 104 into the non-volatile memory 108.

When the processing resource 106 detects that the amount of the used memory 116 is greater than the used memory decay threshold ($UMD_{TH}$) or that the amount of the available memory is less than the available memory decay threshold ($AMD_{TH}$) for the first time, the processing resource 106 may dump certain logs or, in some examples, the entire content of the primary memory 104 into the non-volatile memory 108 as a primary memory backup. For future instances of the amount of the used memory 116 being greater than the used memory decay threshold ($UMD_{TH}$) or that the amount of the available memory being less than the available memory decay threshold ($AMD_{TH}$), the processing resource 106 may incrementally update the primary memory backup stored in the non-volatile memory 108 so that the primary memory backup remains synchronized with the primary memory 104.

Furthermore, optionally, in some examples, at block 910, the processing resource 106 may determine a time remaining ($T_R$) for the primary memory 104 to be exhausted. In one example, the time remaining for the primary memory 104 to be exhausted may refer to a time duration for the used memory 116 to reach the memory exhaustion first threshold ($ME_{TH1}$) during the runtime of the first management system 102. In some examples, the time remaining ($T_R$) may be determined based on a rate of change in the amount of the used memory 116 during the runtime as described below. In order to determine time remaining ($T_R$), the processing resource 106 may log the amount of the used memory at several intervals for each day, in one example. Table-2 presented below represents an example log of the amount of the used memory 116 for six days.

TABLE 2

Example log of the amount of the used memory

| Hour | Day 0 Amount of Used Memory (KiB) | Day 1 Amount of Used Memory (KiB) | Day 2 Amount of Used Memory (KiB) | Day 3 Amount of Used Memory (KiB) | Day 4 Amount of Used Memory (KiB) | Day 5 Amount of Used Memory (KiB) |
|---|---|---|---|---|---|---|
| 1 | 338924 | 339552 | 346148 | 340296 | | 345944 |
| 2 | | | | | | |
| 3 | 339068 | | | | | 348420 |
| 4 | | 339720 | | | | 349824 |
| 5 | | | | | | |
| 6 | 339324 | | | | 340172 | 350968 |
| 7 | 339532 | | | | | 351824 |
| 8 | | 340572 | | | | 352940 |
| 9 | | | | | | |
| 10 | | | | | 340428 | |
| 11 | 339612 | | | 343308 | | 353768 |
| 12 | | | | | | |
| 13 | | 340992 | | | | |
| 14 | | | | | 343240 | 354856 |
| 15 | 339692 | | | | | 355752 |
| 16 | | 344164 | | | | 356864 |
| 17 | | | | | | 364044 |
| 18 | | | | | | 365252 |
| 19 | 339804 | | | | | 367000 |
| 20 | | | | | 343728 | 368856 |
| 21 | | | 346292 | | | 367000 |
| 22 | 340364 | | | | | |
| 23 | | | | | | 368856 |
| 24 | | | | | | |

Additionally, in some examples, the processing resource 106 may also log the all latest highs for any day that had a higher amount of the used memory 116 compared to the previous day along with number of processes running on the first management system 102 when the high was reached. For example, Table-3 presented below shows daily highs of the used memory 116 along with the number of the processes running on the first management system 102 when the respective high was reached, and an average memory utilization for one process. In particular, Table-3 represents data corresponding to the days (e.g., day 0, day 1, day 2, and day 5) that have shown in an increase in the amount of the used memory 116 compared to the previous day.

TABLE 3

Example log of data corresponding to days showing increases utilization of the used memory

| | Day 0 Amount of Used Memory (KiB) | Day 1 Amount of Used Memory (KiB) | Day 2 Amount of Used Memory (KiB) | Day 5 Amount of Used Memory (KiB) |
|---|---|---|---|---|
| Highest Amount of the used memory for a given day | 340364 | 344164 | 346292 | 368856 |
| Number of Processes | 431 | 432 | 431 | 439 |

TABLE 3-continued

Example log of data corresponding to days showing increases utilization of the used memory

|  | Day 0 Amount of Used Memory (KiB) | Day 1 Amount of Used Memory (KiB) | Day 2 Amount of Used Memory (KiB) | Day 5 Amount of Used Memory (KiB) |
|---|---|---|---|---|
| Average memory used by a single process | 789.7 | 796.7 | 803.5 | 840.2 |

As observed from the Table-3, not only there is shown in increase in the number of processes from Day 0 to Day 5, but also the average amount of the used memory 116 occupied per process has also increased. Such an increase in the average amount of the used memory 116 occupied per process may also indicate that overall memory usage is increasing. In some examples, for a given day, the processing resource 106 may determine a time duration for the amount of used memory 116 to reach the memory exhaustion first threshold ($ME_{TH1}$) based on a rate of increase of the amount of the used memory 116. The rate of change (e.g., increase) of the amount of the used memory 116 ($RATE_X$) for a given day X may be determined using peak utilization of previous days those observed increase in the amount of the used memory 116. For example, based on the data of Table-3, the rate of increase in the amount of the used memory 116 on the day 2 (i.e., $RATE_{DAY2}$) may be determined as 344164−340364=3800 KiB/day. Similarly, the rate of increase in the amount of the used memory 116 on day 6 (i.e., $RATE_{DAY6}$) may be determined as (344164−340364)/(5−2)=7521 KiB/day.

In some examples, the processing resource 106 may determine the time remaining ($T_R$) for the primary memory 104 to be exhausted (e.g., the time duration for the used memory to reach the memory exhaustion first threshold ($ME_{TH1}$)) using following equation (3).

$$T_R = \frac{ME_{TH1} + UM_{Latest\ Peak}}{RATE_X} \text{ Days} \quad \text{Equation (3)}$$

Where $UM_{Latest\ Peak}$ may represent latest peak amount of the used memory observed before Day X and $ME_{TH1}$=77000. For example, for Day 2 with $UM_{Latest\ Peak}$ being 344164 KiB and the $RATE_{DAY2}$ being 3800 KiB/day, the time remaining ($T_R$) may be determined as ((77000+344164)/3800)=70.3 days. Similarly, on day 6 with $UM_{Latest\ Peak}$ being 368856 KiB and the $RATE_{DAY6}$ being 7521 KiB/day, the time remaining ($T_R$) may be determined as ((77000+368856)/7521)=38.8 days.

Furthermore, optionally, in some examples, at block 912, the processing resource 106 may issue a warning indicating that the primary memory 104 has started running out of memory and the user may want to take any suitable action (e.g., terminating certain low priority user applications) to that some amount of memory may be freed-up. In some example, the warning issued at block 912 may also include an information regarding the time remaining ($T_R$) to provide the user an idea about how much time is left for the used memory 116 to reach the memory exhaustion first threshold ($ME_{TH1}$). The warning may be issued to the user of the system 200 (or the system 100) via one or more messaging techniques, including but not limited to, displaying a warning message on a display associated with the system 100, 200, via a text message such as an SMS, an MMS, and/or an email, via an audio, video, or an audio-visual alarm, and the like. In certain instances, if the condition that has led to creation of the primary memory backup does not exist due to release of any used memory 116, the processing resource 106 may erase the primary memory backup from the non-volatile memory 108 thereby efficiently managing the storage space in the non-volatile memory 108.

In some examples, the operations at blocks 914, 916, 918, and 920 of FIG. 9 are respectively similar to the operations at blocks 802, 804, 806, and 808 of method 800 of FIG. 8, description of which is not repeated herein.

Figure 10:
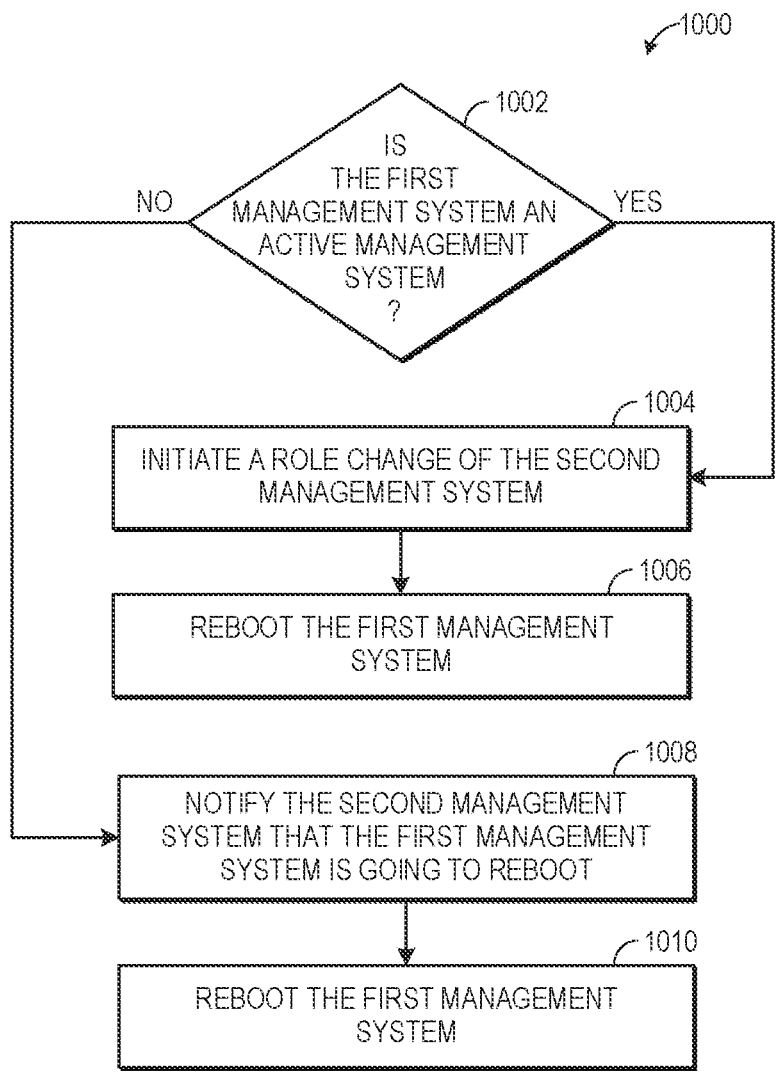
FIG. 10 is a flow diagram depicting a method for enabling a synchronized reboot of a first management system, in accordance with another example.

FIG. 10 is a flow diagram depicting a method 1000 for enabling the synchronized reboot of the first management system 102, in accordance with another example. In particular, the method 1000 may represent an example method to execute the operation that is intended to be performed at block 808 of FIG. 8 or the block 920 of FIG. 9. For illustration purposes, the method 1000 will be described in conjunction with the system 200 of FIG. 2. The method 1000 may include method blocks 1002, 1004, 1006, 1008, and 1010 (hereinafter collectively referred to as blocks 1002-1010) which may be performed by a processor-based system, for example, the first management system 102. In particular, operations at each of the method blocks 1002-1010 may be performed by the processing resource 106 of the first management system 102.

At block 1002, the processing resource 106 may determine whether the first management system 102 is an active management system or a standby management system. In some examples, the first management system 102 may store a role information (e.g., a flag) indicative of the role of the first management system 102 as either the active management system or the standby management system in a predefined memory region of the primary memory 104 and/or the non-volatile memory 108. The processing resource 106 may verify such role information to ascertain whether the first management system 102 is the active management system or the standby management system. At block 1002, if it is determined that the first management system 102 is the active management system, the processing resource 106, at block 1004, may initiate a role change of the second management system 202.

In some examples, to effect such role change, the processing resource 106 of the first management system 102 (which is currently the active management system) may send a role change command the second management system 202 (which is currently the standby management system) requesting the second management system 202 to become the active management system. Upon receipt of such command from the first management system 102, the second management system 202 may change its role to the active management system. In order to effect such change, the second management system 202 may update respective role information (e.g., a flag) to indicate that the role of the second management system 202 is changed to the active management system. Moreover, in some examples, the first management system 102 may also update respective role information (e.g., a flag) to indicate that its role is changed from the active management system to the standby management system. Further, at block 806, the processing resource 106 may reboot the first management system 102 after the role change of the second management system 202 is completed (i.e., after the second management system 202 becomes the active management system).

At block 1002, if it is determined that the first management system 102 is not the active management system (e.g., the first management system 102 being standby management system), the processing resource 106, at block 1008, may notifying the second management system 202 that the first management system is going to reboot. Moreover, at block 1010, the processing resource 106 may rebooting the first management system 102 after notifying the second management system 202.

Figure 11:
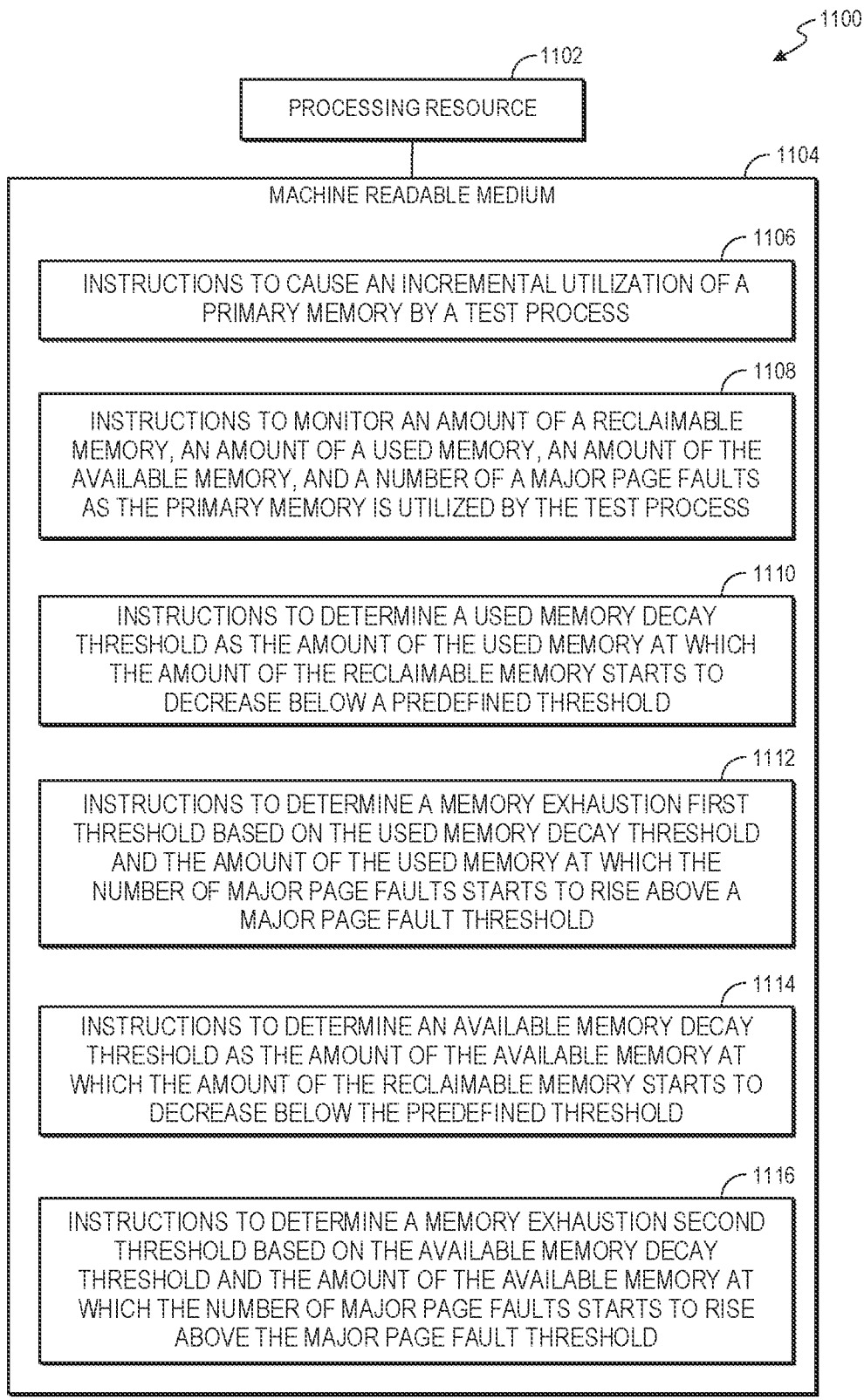
FIG. 11 is a block diagram depicting a processing resource and a machine-readable medium encoded with example instructions to determine memory thresholds for a first management system, in accordance with an example.

Turning now to FIG. 11, a block diagram 1100 depicting a processing resource 1102 and a machine-readable medium 1104 encoded with example instructions to determine various memory thresholds for the first management system 102 is presented, in accordance with an example. The machine-readable medium 1104 may be non-transitory and is alternatively referred to as a non-transitory machine-readable medium 1104. In some examples, the machine-readable medium 1104 may be accessed by the processing resource 1102. In some examples, the processing resource 1102 may represent one example of the processing resource 106 of the first management system 102. Further, the machine-readable medium 1104 may represent one example of the primary memory 104 or the non-volatile memory 108.

The machine-readable medium 1104 may be encoded with executable instructions 1106, 1108, 1110, 1112, 1114, and 1116 (hereinafter collectively referred to as instructions 1106-1116) for performing the methods 300A and 300B described in FIGS. 3A and 3B, respectively. The processing resource 1102 may be physical device, for example, one or more CPU, one or more semiconductor-based microprocessor, ASIC, FPGA, other hardware devices capable of retrieving and executing the instructions 1106-1116 stored in the machine-readable medium 1104, or combinations thereof. In some examples, the processing resource 1102 may fetch, decode, and execute the instructions 1106-1116 stored in the machine-readable medium 1104 to determine various memory thresholds, such as, the used memory decay threshold ($UMD_{TH}$), the available memory decay threshold ($AMD_{TH}$), the memory exhaustion first threshold ($ME_{TH2}$), and the memory exhaustion second threshold ($ME_{TH2}$). In certain examples, as an alternative or in addition to retrieving and executing the instructions 1106-1116, the processing resource 1102 may include at least one IC, other control logic, other electronic circuits, or combinations thereof that include a number of electronic components for determining abovementioned memory thresholds.

In some examples, the instructions 1106 when executed by the processing resource 1102 may cause the processing resource 1102 to cause an incremental utilization of the primary memory 104 by a test process during the memory allocation and monitoring phase (see FIG. 3A). Further, the instructions 1108 when executed by the processing resource 1102 may cause the processing resource 1102 to monitor an amount of the reclaimable memory 126, an amount of the used memory 116, an amount of the available memory, and a number of the major page faults as the primary memory 104 is utilized by the test process during the memory allocation and monitoring phase.

Furthermore, in some examples, the instructions 1110-1116 may be performed during the threshold determination phase (see FIG. 3B) of the test phase. The instructions 1110 when executed by the processing resource 1102 may cause the processing resource 1102 to determine the used memory decay threshold ($UMD_{TH}$) as the amount of the used memory 116 at which the amount of the reclaimable memory 126 starts to decrease below the predefined threshold ($RM_{TH}$). Moreover, the instructions 1112 when executed by the processing resource 1102 may cause the processing resource 1102 to determine the memory exhaustion first threshold ($ME_{TH1}$) based on the used memory decay threshold ($UMD_{TH}$) and the amount of the used memory (e.g., $UMPF_{impact}$) at which the number of major page faults starts to rise above a major page fault threshold ($MPF_{TH}$).

Moreover, in some examples, the instructions 1114 when executed by the processing resource 1102 may cause the processing resource 1102 to determine the available memory decay threshold ($AMD_{TH}$) as the amount of the available memory at which the amount of the reclaimable memory 126 starts to decrease below the predefined threshold ($RM_{TH}$). Additionally, the instructions 1116 when executed by the processing resource 1102 may cause the processing resource 1102 to determine the memory exhaustion second threshold ($ME_{TH2}$) based on the available memory decay threshold ($AMD_{TH}$) and the amount of the available memory (e.g., $AMPF_{impact}$) at which the number of major page faults starts to rise above the major page fault threshold ($MPF_{TH}$).

Figure 12:
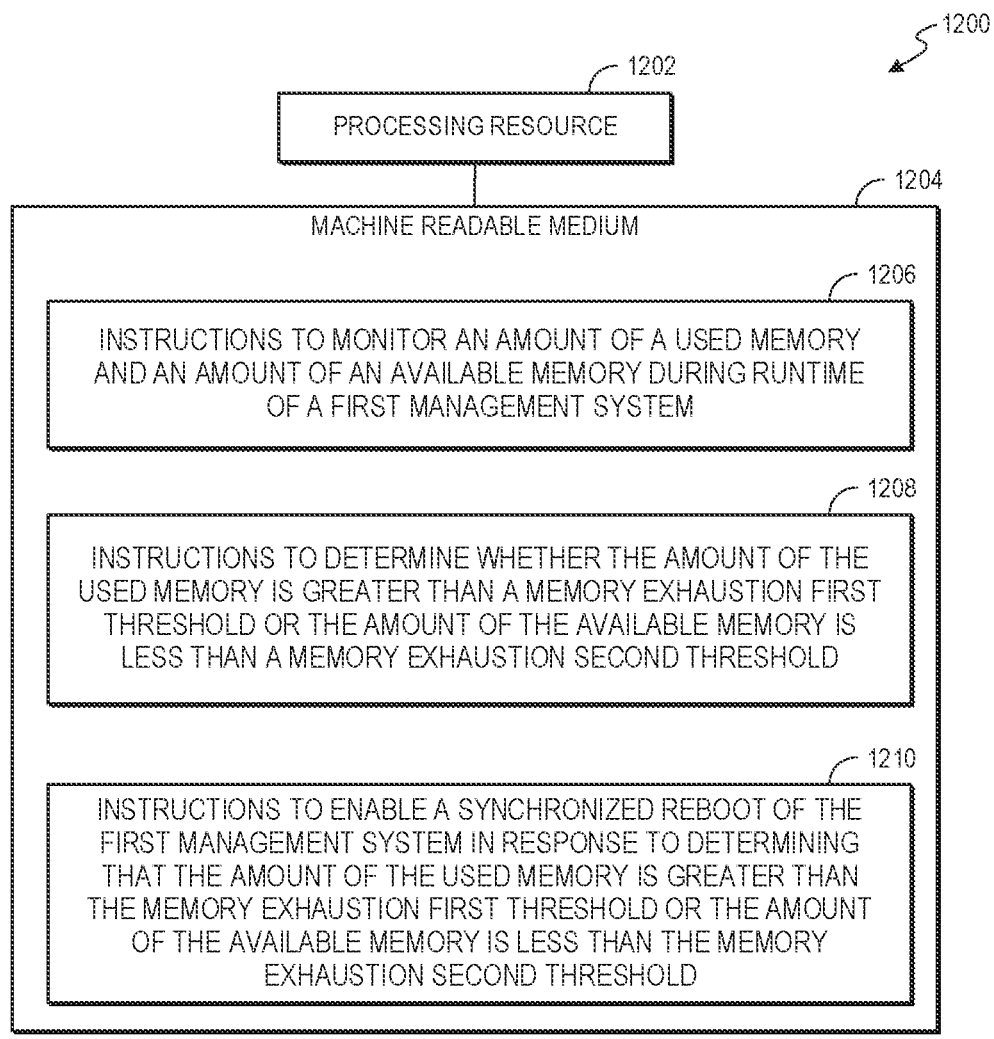
FIG. 12 is a block diagram depicting a processing resource and a machine-readable medium encoded with example instructions to operate a first management system, in accordance with an example.

FIG. 12 is a block diagram 1200 depicting a processing resource 1202 and a machine-readable medium 1204 encoded with example instructions to operate the first management system 102, in accordance with an example. The processing resource 1202 may be representative of one example of the processing resource 1102 and the machine-readable medium 1204 may be representative of one example of the machine-readable medium 1104. In some examples, the machine-readable medium 1204 may be encoded with executable instructions 1206, 1208, and 1210 (hereinafter collectively referred to as instructions 1206-1210) for performing the method 800 described in FIG. 8. Although not shown, in some examples, the machine-readable medium 1204 may be encoded with certain additional executable instructions to perform the methods 900 and 1000 described in FIGS. 9 and 10, without limiting the scope of the present disclosure.

The instructions 1206 when executed by the processing resource 1202 may cause the processing resource 1202 to monitor an amount of the used memory 116 and an amount of an available memory during the runtime of the first management system 102. Further, the instructions 1208 when executed by the processing resource 1202 may cause the processing resource 1202 to determine whether the amount of the used memory 116 is greater than the memory exhaustion first threshold ($ME_{TH1}$) or the amount of the available memory is less than a memory exhaustion second threshold ($ME_{TH2}$) different from the memory exhaustion first threshold ($ME_{TH1}$). Moreover, the instructions 1210 when executed by the processing resource 1202 may cause the processing resource 1202 to enable a synchronized reboot of the first management system 102.

As will be appreciated, the processing resource 106 may enable a synchronized reboot of the first management system 102 in the low-memory situation caused by the amount of the used memory 116 reaching the memory exhaustion first threshold ($ME_{TH1}$) or the amount of the available memory reaching the memory exhaustion second threshold ($ME_{TH2}$). Moreover, comparison of the amount of the used memory 116 and the amount of the available memory respectively with the used memory decay threshold ($UMD_{TH}$) and the available memory decay threshold ($AMD_{TH}$) may help determine start of the depletion of the reclaimable memory 126. Such determination of the start of the depletion of the reclaimable memory 126 may help generate certain warning message so that a user can perform any memory management operation for lowering memory consumption if the user desires to do so. Also, upon determining that the amount of the used memory 116 is greater than the used memory decay threshold ($UMD_{TH}$) or the amount of the available memory is less than the available memory decay threshold ($AMD_{TH}$), the processing resource 106 may proactively start backing-up the data stored in the primary memory 102 into the non-volatile memory 108.

Moreover, the comparison of the amount of the used memory 116 and the amount of the available memory respectively with the memory exhaustion first threshold ($ME_{TH1}$) and the memory exhaustion second threshold ($ME_{TH2}$) may help determine whether there is going to be any drastic increase in the number of major page faults. As soon as the amount of the used memory 116 reaches the memory exhaustion first threshold ($ME_{TH1}$) or the amount of the available memory reaches the memory exhaustion second threshold ($ME_{TH2}$), the processing resource 106 may initiate the synchronized reboot of the first management system 102. Consequently, chances of the OS 105 of the first management system 102 crashing abruptly may be minimized. Further, the synchronized reboot of the first management system 102 may aid in switching over the role of the second management system 202 of the first management system 102 that is operational as the active management system experiences the low-memory situation caused due to the amount of the used memory 116 reaching the memory exhaustion first threshold ($ME_{TH1}$) or the amount of the available memory reaching the memory exhaustion second threshold ($ME_{TH2}$). In such situation, the role of the second management system 202 may be changed to an active management system so that while the first management system 102 undergoes the reboot, the second management system 202 starts to perform operations that the first management system 102 used to perform. Accordingly, performance of the system 200 may not be impacted due the low-memory situation encountered by the first management system 102.

While certain implementations have been shown and described above, various changes in form and details may be made. For example, some features and/or functions that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

Moreover, in the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A system comprising:
   a first management system comprising:
      a primary memory comprising a used memory, and a loosely reserved memory, wherein the loosely reserved memory comprises cache memory having a reclaimable memory; and
      a processing resource coupled to the primary memory, wherein the processing resource is to:
         monitor an amount of the used memory and an amount of an available memory during runtime of the first management system, wherein the available memory is an estimate of an amount of memory from the primary memory that is available to start an application; and
         enable a synchronized reboot of the first management system if the amount of the used memory is greater than a memory exhaustion first threshold or the amount of the available memory is less than a memory exhaustion second threshold different from the memory exhaustion first threshold, wherein the memory exhaustion first threshold and the memory exhaustion second threshold are determined based on usage of the reclaimable memory and a number of major page faults.

2. The system of claim 1, wherein the processing resource is to determine whether the amount of the used memory is greater than the memory exhaustion first threshold or whether the amount of the available memory is less than the memory exhaustion second threshold.

3. The system of claim 2, further comprising a second management system coupled to the first management system, wherein the first management system is an active management system and the second management system is a standby management system, and wherein to enable the synchronized reboot of the first management system, the processing resource is to:
   initiate a role change of the second management system in response to determining that the amount of the used memory is greater than the memory exhaustion first threshold or the amount of the available memory is less than the memory exhaustion second threshold; and
   reboot the first management system after the role change of the second management system is completed.

4. The system of claim 2, further comprising a second management system coupled to the first management system, wherein the second management system is an active management system and the first management system is a standby management system, and wherein to enable the synchronized reboot of the first management system, the processing resource is to:
   notify the second management system that the first management system is going to reboot in response to determining that the amount of the used memory is greater than the memory exhaustion first threshold or the amount of the available memory is less than the memory exhaustion second threshold; and
   reboot the first management system after notifying the second management system.

5. The system of claim 1, wherein the processing resource is to:
   determine whether the amount of the used memory is greater than a used memory decay threshold or whether the amount of the available memory is less than an available memory decay threshold; and
   synchronize data stored in the primary memory with a non-volatile memory separate from the primary memory in response to determining that the amount of the used memory is greater than the used memory decay threshold or the amount of the available memory is less than the available memory decay threshold.

6. The system of claim 5, wherein the processing resource is to:
   cause an incremental utilization of the primary memory by a test process during a test phase of the first management system; and
   monitor an amount of the reclaimable memory, the amount of the used memory, the amount of the available memory, and the number of the major page faults as the primary memory is utilized by the test process during the test phase.

7. The system of claim 6, wherein the processing resource is to determine, during the test phase, the used memory decay threshold as the amount of the used memory at which the amount of the reclaimable memory starts to decrease below a predefined threshold.

8. The system of claim 7, wherein the processing resource is to determine, during the test phase, the memory exhaustion first threshold based on the used memory decay threshold and the amount of the used memory at which the number of major page faults starts to rise above a major page fault threshold.

9. The system of claim 6, wherein the processing resource is to determine, during the test phase, the available memory decay threshold as the amount of the available memory at which the amount of the reclaimable memory starts to decrease below a predefined threshold.

10. The system of claim 9, wherein the processing resource is to determine, during the test phase, the memory exhaustion second threshold based on the available memory decay threshold and the amount of the available memory at which the number of major page faults starts to rise above a major page fault threshold.

11. A method comprising:
in a first management system comprising a primary memory having a used memory and a loosely reserved memory, wherein the loosely reserved memory comprises cache memory having a reclaimable memory:
  monitoring an amount of the used memory and an amount of an available memory during runtime of the first management system, wherein the available memory is an estimate of an amount of memory from the primary memory that is available to start an application;
  determining whether the amount of the used memory is greater than a memory exhaustion first threshold or the amount of the available memory is less than a memory exhaustion second threshold different from the memory exhaustion first threshold, wherein the memory exhaustion first threshold and the memory exhaustion second threshold are determined based on usage of the reclaimable memory and a number of major page faults; and
  enabling a synchronized reboot of the first management system in response to determining that the amount of the used memory is greater than the memory exhaustion first threshold or the amount of the available memory is less than the memory exhaustion second threshold.

12. The method of claim 11, wherein the first management system is coupled to a second management system, and wherein the first management system is an active management system and the second management system is a standby management system, wherein enabling the synchronized reboot of the first management system comprises:
  initiating a role change of the second management system in response to determining that the amount of the used memory is greater than the memory exhaustion first threshold or the amount of the available memory is less than the memory exhaustion second threshold; and
  rebooting the first management system after the role change of the second management system is completed.

13. The method of claim 11, wherein the first management system is coupled to a second management system, and wherein the second management system is an active management system and the first management system is a standby management system, wherein enabling the synchronized reboot of the first management system comprises:
  notifying the second management system that the first management system is going to reboot in response to determining that the amount of the used memory is greater than the memory exhaustion first threshold or the amount of the available memory is less than the memory exhaustion second threshold; and
  rebooting the first management system after notifying the second management system.

14. The method of claim 11, further comprising:
  determining whether the amount of the used memory is greater than a used memory decay threshold or whether the amount of the available memory is less than an available memory decay threshold; and
  synchronizing data stored in the primary memory with a non-volatile memory separate from the primary memory in response to determining that the amount of the used memory is greater than the used memory decay threshold or the amount of the available memory is less than the available memory decay threshold.

15. The method of claim 14, further comprising:
  during a test phase of the first management system different from the runtime of the first management system:
    causing an incremental utilization of the primary memory by a test process;
    monitoring an amount of the reclaimable memory, the amount of the used memory, the amount of the available memory, and the number of the major page faults as the primary memory is utilized by the test process;
    determining the used memory decay threshold as the amount of the used memory at which the amount of the reclaimable memory starts to decrease below a predefined threshold;
    determining the memory exhaustion first threshold based on the used memory decay threshold and the amount of the used memory at which the number of major page faults starts to rise above a major page fault threshold;
    determining the available memory decay threshold as the amount of the available memory at which the amount of the reclaimable memory starts to decrease below the predefined threshold; and
    determining the memory exhaustion second threshold based on the available memory decay threshold and the amount of the available memory at which the number of major pale faults starts to rise above the major page fault threshold.

16. The method of claim 11, further comprising determining, during the runtime, a time remaining for the amount of the used memory to reach the memory exhaustion first threshold based on a rate of change in the amount of the used memory.

17. A non-transitory machine-readable medium storing instructions executable by a processing resource in a first management system comprising a primary memory having a used memory and a loosely reserved memory, wherein the loosely reserved memory comprises cache memory having a reclaimable memory, the instructions comprising:
  instructions to monitor an amount of the used memory and an amount of an available memory during runtime of the first management system, wherein the available memory is an estimate of an amount of memory from the primary memory that is available to start an application;

instructions to determine whether the amount of the used memory is greater than a memory exhaustion first threshold or the amount of the available memory is less than a memory exhaustion second threshold different from the memory exhaustion first threshold, wherein the memory exhaustion first threshold and the memory exhaustion second threshold are determined based on usage of the reclaimable memory and a number of major page faults; and instructions to enable a synchronized reboot of the first management system in response to determining that the amount of the used memory is greater than the memory exhaustion first threshold or the amount of the available memory is less than the memory exhaustion second threshold.

18. The non-transitory machine-readable medium of claim 17, further comprising:

instructions to determine whether the amount of the used memory is greater than a used memory decay threshold or whether the amount of the available memory is less than an available memory decay threshold; and instructions to synchronize data stored in the primary memory with a non-volatile memory separate from the primary memory in response to determining that the amount of the used memory is greater than the used memory decay threshold or the amount of the available memory is less than the available memory decay threshold.

19. The non-transitory machine-readable medium of claim 17, wherein the first management system is coupled to a second management system, and wherein the first management system an active management system and the second management system is a standby management system, wherein the instructions to enable the synchronized reboot of the first management system comprises:

instructions to initiate a role change of the second management system in response to determining that the amount of the used memory is greater than the memory exhaustion first threshold or the amount of the available memory is less than the memory exhaustion second threshold; and instructions to reboot the first management system after the role change of the second management system is completed.

20. The non-transitory machine-readable medium of claim 17, wherein the first management system is coupled to a second management system, and wherein the second management system an active management system and the first management system is a standby management system, wherein the instructions to enable the synchronized reboot of the first management system comprises:

instructions to notify the second management system that the first management system is going to reboot in response to determining that the amount of the used memory is greater than the memory exhaustion first threshold or the amount of the available memory is less than the memory exhaustion second threshold; and instructions to reboot the first management system after notifying the second management system.

\* \* \* \* \*